US012056265B2

(12) United States Patent
Duffy et al.

(10) Patent No.: US 12,056,265 B2
(45) **Date of Patent: *Aug. 6, 2024**

(54) USER INTERFACE MANIPULATION IN A FLEXIBLE SCREEN DEVICE

(71) Applicant: JVCKENWOOD Corporation, Yokohama (JP)

(72) Inventors: David Michael Duffy, Zurich (CH); Jan Jasper van den Berg, London (GB); Bernadette Elliott-Bowman, Leatherhead (GB); Masato Sugano, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,818

(22) Filed: Dec. 29, 2022

(65) Prior Publication Data

US 2023/0139775 A1 May 4, 2023

Related U.S. Application Data

(63) Continuation of application No. 17/031,385, filed on Sep. 24, 2020, now Pat. No. 11,574,081.

(Continued)

(51) Int. Cl.
*G09G 5/00* (2006.01)
*G06F 1/16* (2006.01)
(Continued)

(52) U.S. Cl.
CPC ............ *G06F 21/84* (2013.01); *G06F 1/1618* (2013.01); *G06F 1/1681* (2013.01); *G06F 3/013* (2013.01);
(Continued)

(58) Field of Classification Search
CPC .... G06F 1/1618; G06F 1/1641; G06F 1/1647; G06F 1/1652; G06F 1/1677;
(Continued)

(56) References Cited

U.S. PATENT DOCUMENTS 8,279,716 B1 10/2012 Gossweiler et al.
8,803,816 B2 * 8/2014 Kilpatrick, II ........ G06F 1/1654 345/173

(Continued)

FOREIGN PATENT DOCUMENTS

EP 2500898 A1 * 9/2012 .............. G09G 3/03

OTHER PUBLICATIONS

"International Search Report and Written Opinion dated Jun. 22, 2020 for PCT Application No. PCT/JP2021/010438", 13 pages.

*Primary Examiner* — Joe H Cheng
(74) *Attorney, Agent, or Firm* — Perkins Coie LLP; Han-Wei Chen; Andrew T. Pettit

(57) ABSTRACT

User interface (UI) manipulation techniques are disclosed that can allow a user device to hide and obscure sensitive information displayed on a flexible, foldable, or otherwise reconfigurable display from onlookers whilst maintaining or improving its accessibility exclusively to the primary user. Examples of the disclosed techniques can manipulate the UI in a way such that it is largely only viewable as intended when the user device is physically configured to a certain folding angle (and/or viewing angle). In some examples, the UI can be customized such that it promotes a certain device configuration (e.g., folding angle) that can provide an optimum security configuration for the user's current surroundings. The UI displayed on the display screen can change in form factor (e.g., an intended size as viewed by the user) to adapt to the current surroundings and/or based on the sensitivity in the displayed content.

30 Claims, 22 Drawing Sheets

Related U.S. Application Data

(60) Provisional application No. 63/008,473, filed on Apr. 10, 2020, provisional application No. 62/991,553, filed on Mar. 18, 2020.

(51) Int. Cl.

| | |
|---|---|
| ***G06F 3/01*** | (2006.01) |
| ***G06F 3/04845*** | (2022.01) |
| ***G06F 21/84*** | (2013.01) |

(52) U.S. Cl.
CPC .......... *G06F 3/017* (2013.01); *G06F 3/04845* (2013.01); *G06F 2203/04803* (2013.01)

(58) Field of Classification Search
CPC ........ G06F 1/1681; G06F 3/013; G06F 3/017; G06F 3/04845; G06F 21/84; G06F 21/6245; G06F 2200/1637; G06F 2203/04102; G06F 2203/04803; G06F 2221/032; G09F 9/301; H04W 12/02; H04W 12/67
See application file for complete search history.

(56) References Cited

U.S. PATENT DOCUMENTS

| | | | | |
|---|---|---|---|---|
| 8,988,349 | B2 | 3/2015 | Alberth et al. | |
| 9,933,819 | B2 * | 4/2018 | Kim | G06F 3/0412 |
| 10,127,884 | B2 | 11/2018 | Na | |
| 10,747,264 | B1 | 8/2020 | Knoppert et al. | |
| 11,487,496 | B2 * | 11/2022 | Eronen | G06F 1/1618 |
| 2005/0276164 | A1 | 12/2005 | Amron | |
| 2012/0313862 | A1 | 12/2012 | Ko et al. | |
| 2012/0329528 | A1 | 12/2012 | Song | |
| 2015/0150140 | A1 | 5/2015 | Biswas et al. | |
| 2016/0098137 | A1 | 4/2016 | Kim et al. | |
| 2016/0239091 | A1 | 8/2016 | Forutanpour et al. | |
| 2016/0253141 | A1 | 9/2016 | Sarkar et al. | |
| 2020/0012412 | A1 | 1/2020 | Kang et al. | |

* cited by examiner

150

| | Folding Angle UI Adjustment | |
|---|---|---|
| | Static | Dynamic |
| Viewing Angle UI Adjustment — Static | (A) | (C) |
| Viewing Angle UI Adjustment — Dynamic | (B) | (D) |

(As-seen-by-user UI)

Folding Angle (Actual UI)

<NOTE> Please fold your phone to a narrower folding angle until the black oval becomes a perfect circle (and the UI looks straight and level).

(When fully open)

(When folded)

USER INTERFACE MANIPULATION IN A FLEXIBLE SCREEN DEVICE

CROSS-REFERENCE TO RELATED APPLICATIONS

This application is a continuation of U.S. application Ser. No. 17/031,385, titled "User Interface Manipulation in a Foldable Screen Device" and filed Sep. 24, 2020, now U.S. Pat. No. 11,573,081, which claims priority to U.S. Provisional Application No. 63/008,473, titled "User Interface Manipulation in a Foldable Screen Device" and filed on Apr. 10, 2020, and U.S. Provisional Application No. 62/991,553, titled "Foldable Phone UI Manipulation for Privacy" and filed on Mar. 18, 2020. Each of these applications is incorporated by reference herein in its entirety.

TECHNICAL FIELD

This disclosure relates generally to data security, and more particularly, to protecting sensitive information displayed on a mobile end user device against attempts by onlookers to misappropriate such information.

BACKGROUND

With the prevalence of computers and portable electronic devices, the preferred mode of information presentation has long since shifted from paper to electronic. Typically, such an electronic device is equipped with a display screen (e.g., a liquid-crystal display (LCD) screen) that presents visual information to a human user.

In many instances, for example, when financial or commercial transactions are involved, sensitive information such as a social security number or bank account number may be displayed on the display screen. This state of technology has created a vulnerability to an unscrupulous onlooker stealing sensitive personal and financial information from the user by looking at user's information from the sides of the device and taking a mental or actual picture.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figures 1A, 1D:
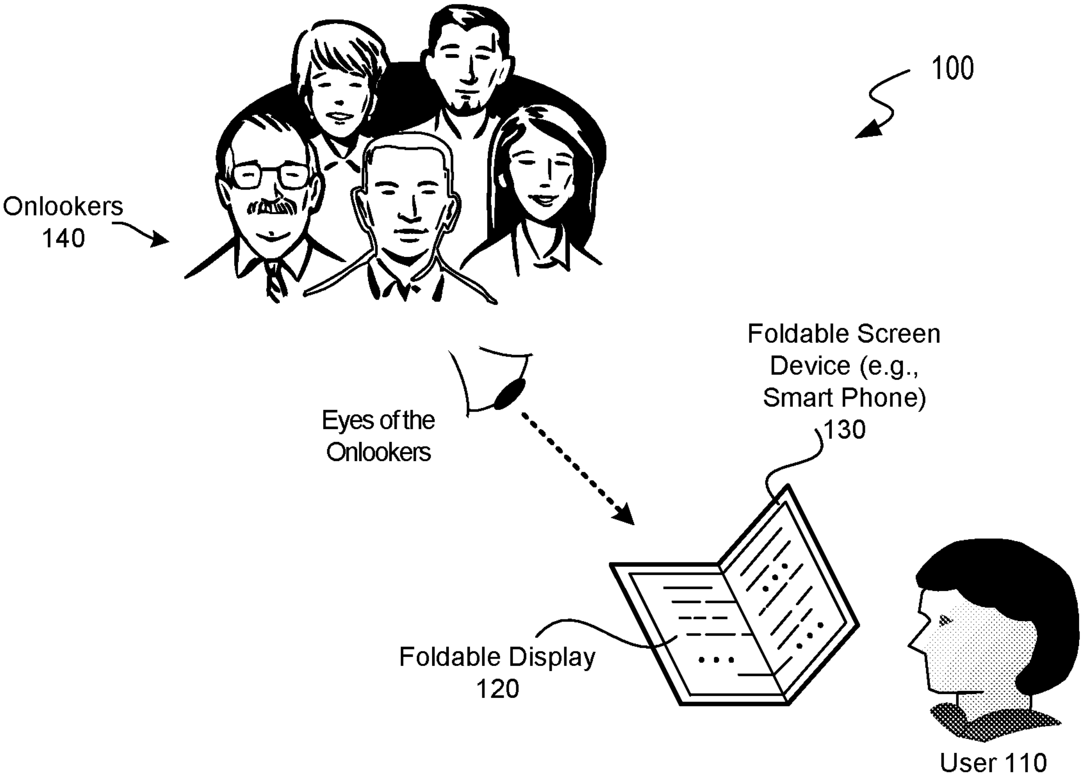
FIG. 1A illustrates an example environment in which a foldable phone user interface (UI) as introduced here can be implemented.
FIG. 1D illustrates a table showing different configurations of the disclosed UI manipulation techniques.

References in this description to "an embodiment," "one embodiment," or the like, mean that the particular feature, function, structure, or characteristic being described is included in at least one embodiment of the present disclosure. Occurrences of such phrases in this specification do not necessarily all refer to the same embodiment. On the other hand, the embodiments referred to also are not necessarily mutually exclusive.

As mentioned above, financial and commercial transactions are increasingly taking place on computers and other portable electronic devices like mobile phones instead of paper. Typically, such an electronic device is equipped with a display screen (e.g., a liquid crystal display (LCD) screen) that presents visual information to a human user. In many instances, e.g., when financial or commercial transactions are involved, sensitive information such as a social security number or bank account number may be displayed on the display screen. With smartphones taking up an ever-greater share of the payments market, more and more people regularly use their smartphones for banking applications. People may attempt to input and read private data in very insecure, public places. This state of technology has created a vulnerability to malicious people and agents who can physically view a user's interaction with his or her device and steal sensitive personal and financial information from the user by looking at user's information from the sides of the device and taking a mental or actual picture.

Meanwhile, in the last decade there have been great advances in the creation of flexible displays (e.g., with fabric-based substrates), primarily driven by advances in organic light emitting diode (OLED) display technology. These flexible display devices allow for different configurations within a single device, such as allowing variable screen size, to meet application needs and variable physical configurations. As flexible displays are improved, they enable a variety of new physical configurations for user interfaces and modes of interaction. The UI elements (e.g., screen(s)) of foldable phones can be quickly manipulated into different shapes or changed to different folding angles. In addition to flexible displays, with the prevalence and ever reduced manufacturing cost for even conventional displays, devices that have rigid displays but with two or more screens (e.g., a bi-foldable phone with two screens) have also surfaced in the market.

Introduced here, therefore, are user interface (UI) manipulation techniques that can allow a user device to hide and obscure sensitive information displayed on a flexible, foldable, or otherwise reconfigurable display from onlookers whilst maintaining or improving its accessibility exclusively to the primary user. More specifically, one or more embodiments of the disclosed techniques can manipulate the UI in a way such that it is largely only viewable as intended when the user device is physically configured to a certain folding angle. In some examples, the UI can be customized such that it promotes a certain device configuration (e.g., folding angle) that can provide an optimum security configuration for the user's current surroundings. The UI displayed on the display screen can change in form factor (e.g., an intended size as viewed by the user) to adapt to the current surroundings (e.g., when the user moves from one surrounding to the other or as the surrounding changes around the user). Additionally, or alternatively, the UI displayed can change its form factor based on the sensitivity in the displayed content.

By UI manipulation, the techniques introduced here enables hiding or obscuring information displayed on a device in an intuitive way that usability and readability are maintained for the user, thereby implementing an effective user interface system that helps the user to easily achieve an optimum screen configuration for security and prevent unintended data loss to onlookers.

In the following description, the example of a foldable mobile device is used, for illustrative purposes only, to explain various aspects of the techniques. Note, however, that the techniques introduced here are not limited in applicability to foldable mobile phones or to any other particular kind of devices. Also, even though the following description focuses on implementing various aspects of the disclosed techniques on a mobile phone, other electronic devices or systems (e.g., a laptop or a tablet) may adapt the techniques in a similar manner. The term "foldable display" or "foldable screen," used interchangeably here unless made apparent otherwise by the context, refers to any variation of a display where the display area is foldable, which should at least include two variants: (1) a display with at least one flexible screen (e.g., a piece of flexible OLED display screen) that is configured to be foldable, and (2) a display with at least two sections, each of the two sections having a screen, but with the two sections configured to function together (or collectively) as one screen, and with the two sections being mechanically coupled to each other via a foldable mechanism. Some examples of a foldable screen include bifold displays, trifold displays, etc.

In this description, the term "user" generally refers to anyone who physically operates a mobile device, whereas the term "onlooker" generally refers to anyone who is physically in vicinity to the user but not who physically operates the mobile device. Also, note that the UI manipulation techniques introduced here shall be distinguished from techniques that simply use a smaller than full area to display the information (e.g., by using fewer pixels to display, like simply shrinking a 1900×1200 pixel display to a 1680×1050 pixel display); as discussed herein, the UI manipulation techniques utilize visual deformation so as to intuitively require the user to put the phone into certain physical device configuration (e.g., folding angle) before the user can view the UI correctly. As such, the term "form factor" in this disclosure, and in the context of a display, generally refers to how large or small the display should visually appear to the user (i.e., as viewed from the user's perspective) and not from a third party (e.g., an onlooker). In a similar token, for the purpose of discussion herein, unless otherwise made apparent in the context of the description, the term "viewed" or "perceived" is used with respect to the perspective of the user of the device in question, and not from another party.

Note that the drawings presented here are mere examples for purposes of facilitating the discussion of the disclosed UI manipulation techniques; they are not drawn to scale.

Application Environment

FIG. 1A illustrates an environment 100 in which a foldable phone user interface as introduced here can be implemented. Illustrated in the environment 100 is a user 110 interacting with a foldable screen 120 on a foldable mobile device 130 in the presence of a number of onlookers 140. Because the onlookers 140 are present in the environment 100, there is a high likelihood that the onlookers 140 may steal user's information that is displayed on the mobile device 130's user interface (i.e., as directly shown on the foldable screen 120 in a conventional manner). As shown in FIG. 1A, the mobile device 130 is displaying user's private and sensitive information where there is a risk to user's privacy. As such, there is a need to protect the user 110's information from being stolen by the onlookers 140.

Accordingly, as discussed in more detail below, the UI manipulation techniques disclosed here can manipulate the UI in a way such that it becomes substantially viewable to the user only when the device is configured/reconfigured by the user to a select device configuration (e.g., folded at a certain folding angle and/or, in some embodiments, viewed from a certain viewing angle). In other words, the disclosed UI system can manipulate the UI such that the resulting UI can visually appear from the user 110's perspective, a size and/or at an angle that increases security, when the user device is physically configured to a certain folding angle and/or viewing angle.

In one or more examples, the disclosed UI manipulation system can determine the level of privacy risk of user's surrounding environment by finding the possibility of the presence and the potential number of onlookers in user's environment. Additionally, or alternatively, the UI system can determine the level of sensitivity of the private and sensitive information presented on user's mobile device 130. Then, in some embodiments, based on the level of privacy risk of user's surrounding environment and/or the level of sensitivity of the private and sensitive information presented on user's mobile device 130, the UI system can determine the form factor for how the sensitive information is to be displayed on the foldable screen 120, such that only the user 110 is in a position to get an undistorted view of the sensitive information. In these embodiments, the sensitive information can remain distorted to the user 110 as well unless the foldable screen 120 is manipulated to a select folding angle and/or a select viewing angle. Said another way, in some examples, the UI can be customized such that it promotes a certain device configuration (e.g., folding angle and/or viewing angle) that can provide an optimum security configuration for the user's current environment 100.

Folding Angle

Figure 1B:
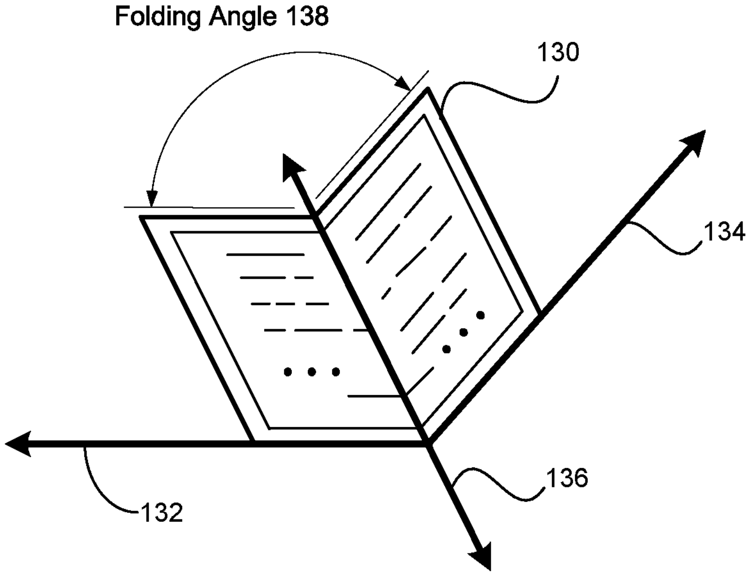
FIG. 1B illustrates a folding angle of an example foldable phone.

FIG. 1B illustrates a folding angle 138 of a foldable phone (e.g., user device 130). As illustrated in FIG. 1B, a folding angle 138 is the angle between the sections of a multi-section foldable mobile device (e.g., user device 130). More specifically, the folding angle 138 is formed by the angle between two axes: a first axis 132 that extends along the surface of a first section (e.g., the left section) of the foldable phone 130, and a second axis 134 that extends along the surface of a second section (e.g., the right section) of the foldable phone 130. The first and second sections of the foldable phone 130 are mechanically connected and fold along a hinge axis 136. The UI on the device 130, as shown in FIG. 1B, is collectively displayed by the left and right sections of the foldable display.

Note that, for simplicity of the discussion, the bi-fold display embodiments described here focus on a configuration that folds in a lateral direction (e.g., from left to right); however, the disclosed techniques can be applied similarly to those embodiments with a configuration that folds in a longitudinal direction (e.g., from top to bottom). In some of those embodiments, the configuration can be interchangeable, e.g., such as via a manual or automatic screen rotate function, such that the configuration can better suit the user's preference and the current device orientation.

According to the present embodiments, the folding angle 138 can be selected, and the UI be accordingly distorted, such that when on a foldable screen (e.g., screen 120) of the foldable phone 130 is folded or manipulated to the select folding angle (or the desired folding angle), the user interface is optimally readable by the user 110 but distorted to the rest of the surroundings (e.g., onlookers 130). The select folding angle can also be described as the optimum interior angle at which the display screen 120 is folded. For example, where the display is a bifold display (e.g., single hinge), the folding angle is the interior angle at which the display is folded.

In some embodiments, the desired folding angle can be determined based on the sensitivity of the private information to be displayed on the user interface and/or the presence of potential onlookers in the user's surroundings, to obscure their view of user's private on-screen information. For example, when a user wants to access private or secure data, phone camera data can be used to determine the presence of any potential onlookers in the user's surroundings.

When an optimum folding angle for the phone is determined, a user interface can be generated/distorted/customized such that it is to be readable at the optimum folding angle. The user folds the phone to a certain degree in order to make the user interface readable at the user's position, blocking the view of potential onlookers from overlooking at the user's private information. For example, a user wants to see his or her bank account information whilst sitting on the bus. When the user accesses the software application (e.g., a bank's proprietary application) installed on a foldable phone introduced here, the phone presents the user with a user interface that appears distorted. The user closes the phone to a narrower angle until the user interface becomes visually readable (e.g., edges and fonts not appearing as skewed/distorted) from the user's perspective, in the meantime blocking the contents (from having the phone closed to a narrower angle) from the potential onlookers around the user.

Viewing Angle

Figure 1C:
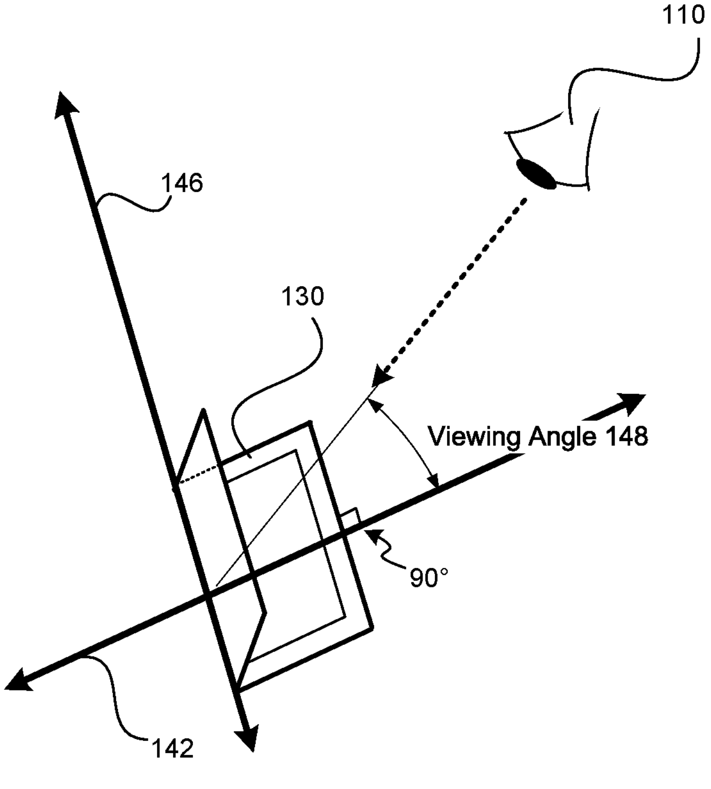
FIG. 1C illustrates a viewing angle of an example foldable phone with respect to a human user.

FIG. 1C illustrates a viewing angle 148 of an example foldable phone (e.g., user device 130) with respect to a user (e.g., user 110). Generally, the viewing angle is the angle of the orientation of the mobile device 130 to the user 110. The viewing angle can also be understood as the location of the user 110's eyes with respect to the foldable device 130. As illustrated in FIG. 1C, in a bi-folding phone example, the viewing angle 148 can be the angle between a first axis 142 that is perpendicular (i.e., 90°) to the non-folding edges of the device 130, and the user 110's line of sight. The bi-folding device in FIG. 1C folds about a hinge axis 146 that is centrally located (e.g., which is the same configuration as the hinge axis 136).

Note that, for convenience, as shown in FIG. 1C, the disclosure here assumes that a gaze point (i.e., where the user's eyes focus on) is the center of the screen. The gaze point defines a starting edge from which the viewing angle 148 can be measured. While this definition of the viewing angle and/or the assumption of the gaze point can vary upon the implementation (e.g., the gaze point can be on the top or the bottom of the screen; or, in some implementations, the gaze point may be dynamically determined by a sensor), the UI manipulation techniques disclosed here are similarly applicable regardless of the variation in the definition of the viewing angle and/or the location of the gaze point.

Static Versus Dynamic UI Adjustment

The UI generated by the UI manipulation techniques here generally has the effect of being only viewable to the user (i.e., from user's perspective) as not visually deformed or distorted when the foldable screen is folded to the intended folding angle and the screen is viewed from the intended viewing angle. As such, depending on the embodiment, the user device can have the options of either adjusting the UI distortion dynamically or statically. For purposes of discussion here, the term "static UI manipulation" means that the UI is only manipulated/distorted (e.g., in manners described with respect to FIG. 2A, discussed below) for viewing at an optimum folding angle and/or from an optimum viewing angle; it is "static" in the sense that the UI rendering does not change based on the actual folding angle of the device or the actual location of the user's eye position/gaze point. In contrast, the term "dynamic UI manipulation" means that the UI rendering changes and receives adjustments based on the actual folding angle of the device and/or the actual location of the user's eye position/gaze point.

More specifically, as shown in table 150 in FIG. 1D, there are four different combinations of UI adjustment configuration: (A) both the folding angle UI adjustment and the viewing angle UI adjustment being static; (B) static folding angle UI adjustment and dynamic viewing angle UI adjustment; (C) dynamic folding angle UI adjustment and static viewing angle UI adjustment; and (D) both the folding angle UI adjustment and the viewing angle UI adjustment being dynamic. For the embodiments that implement static folding angle adjustment, the UI distortion that is generated need not take into consideration the actual folding angle of the device; rather, the UI is generated based on the select optimum folding angle, and it is up to the user to reconfigure the device (e.g., by folding the screen) to the optimum folding angle in order to view the correct UI. Similarly, for the embodiments that implement static viewing angle adjustment, the UI distortion that is generated need not take into consideration the user's eye location/gaze point; rather, the UI is generated based on the select optimum viewing angle, and it is up to the user to adjust the device to a holding position/orientation/etc., and/or to reposition the eyes of the user with respect to the device, such that the device is viewed from the optimum viewing angle in order for the user to view the correct UI.

In contrast, for the embodiments that implement dynamic folding angle adjustment, the UI distortion that is dynamically generated and adjusted by taking into consideration the actual folding angle of the device; that is, the UI can morph as the actual folding angle changes. Similarly, for the embodiments that implement dynamic viewing angle adjustment, the UI distortion that is generated does take into consideration the user's eye location/gaze point. In other words, the UI is dynamically generated and adjusted based on the actual location/gaze point of the eyes of the user. With dynamic viewing angle adjustment, the user need not adjust the holding position/orientation/etc. and can view the correct UI generally from any viewing angle available to the user.

For simplicity, unless otherwise made apparent by the context, the following description for the UI manipulation techniques will primarily focus on the configuration that employs static folding angle UI adjustment and dynamic viewing angle UI adjustment, that is, configuration (B). It is observed here that configuration (B) may be preferred in many field applications because of at least two benefits: first, the static folding angle forces the user to change the folding angle, thus facilitating the protection of the sensitive data against onlookers; and second, the dynamic viewing angle, which changes the UI distortion based on where the user's eye location is, provides convenience and increases usability to the user. In comparison, configuration (A) may be preferred in a low cost and/or low power implementation, where extra sensor systems such as a user eye tracking system can be either cost prohibitive and/or too power consuming. On the other hand, configuration (D) comparatively provides the most seamless user experience because regardless of the user's current folding angle or gaze point, the UI remains viewable to the user; however, it would be less secure than configurations with static folding angles because the user would be less inclined to make any adjustment (e.g., folding the phone narrower) if the viewability of the UI remains the same to the user.

Despite the preference on configuration (B), the disclosed techniques can be similarly applicable to configurations (A), (C), and (D) as well. Specifically, in the following description where the determination and generation of the optimum folding angle is discussed, the same or similar considerations (e.g., regarding information internal and/or external to the user device) can be applied to the determination and generation of the optimum viewing angle (e.g., for those implementations with static viewing angle adjustment). In some embodiments, the user can be given an option to select among different configurations.

Further, it is noted that in some embodiments, the UI distortion can be "updated" based on the determined level of sensitivity of the user's private information and/or the determined level of privacy risk; while these "updates" to the UI distortion may also be generally understood in some sense as "dynamic" because that are made in response to a change in either the sensitivity or the displayed data of the privacy risk in the surroundings, or both, this type of discussion is made apparent in the context and not to be confused with the general discussion of dynamic UI manipulation that is responsive to the user's gaze point and/or the folding angle (i.e., parameters that are within the control of the user).

User Interface Manipulation for Sensitive Data Protection

Figure 2A:
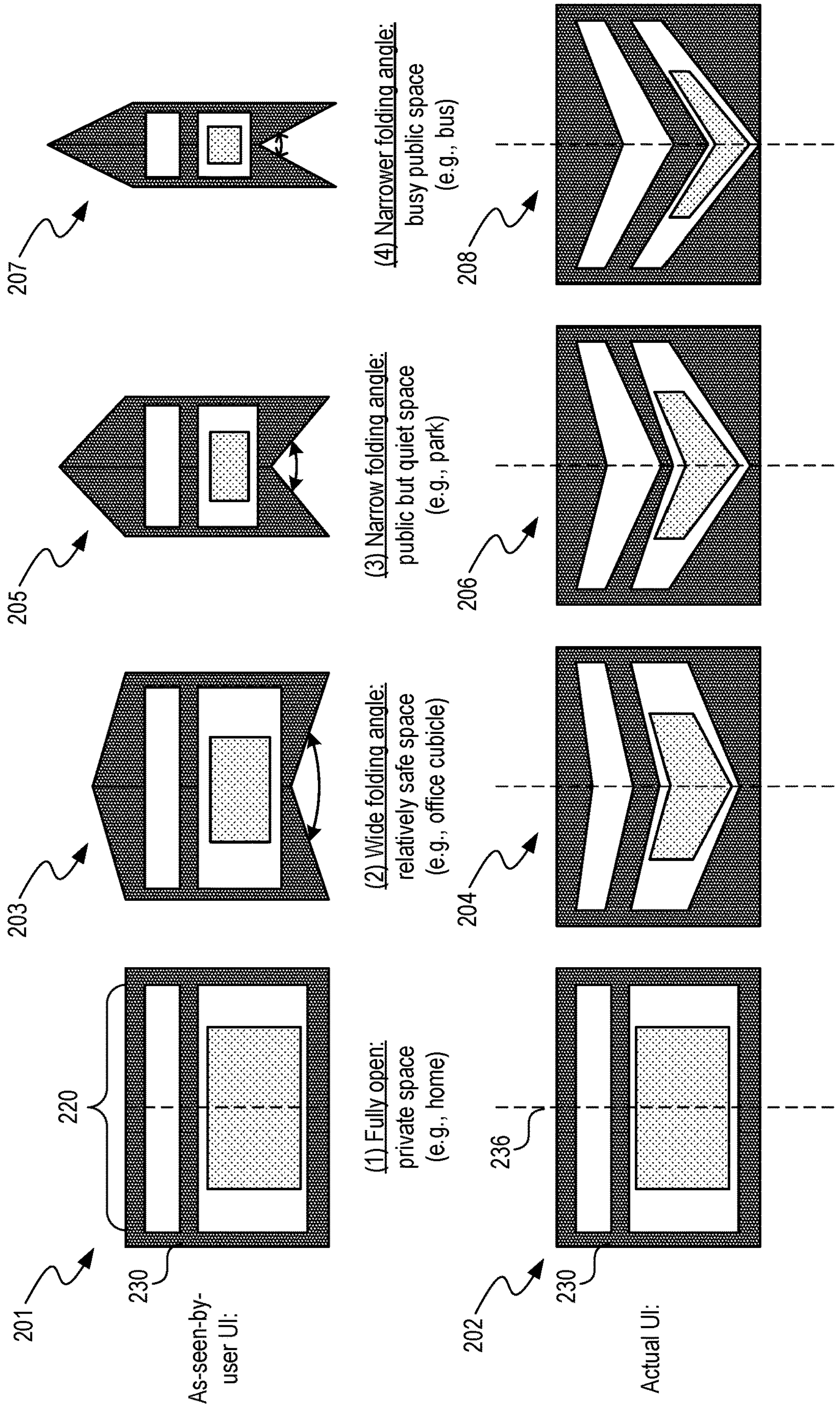
FIG. 2A illustrates examples of how a foldable phone UI as introduced here can be implemented for different privacy scenarios.

FIG. 2A illustrates examples of how a foldable phone user interface as introduced here can be implemented for privacy and sensitive data protection. Shown in FIG. 2A is a foldable mobile phone 230 that has a bi-fold display 220, which folds about a hinge axis 236. Also shown in FIG. 2A are example UIs 201-208 respectively show four sets of combinations (i.e., the first set being example UIs 201-202, second set being example UIs 203-204, and so forth) of how the foldable mobile phone 230 can be manipulated for different folding in four different example privacy scenarios—(1) private space, (2) relatively safe space, (3) public but quiet space, and (4) busy public space. In the following, the privacy scenarios and their corresponding holding angles are merely for discussion purposes; depending on the implementation, more or fewer scenarios can be employed, and different holding angles may be adopted.

Example UIs 201, 203, 205, and 207 show the UI as it appears to the user (e.g., user 110) in different privacy scenarios, and example UIs 202, 204, 206, and 208 show the actual UI as displayed on the bi-fold screen 220. Specifically, the actual UI representations in example UIs 202, 204, 206, and 208 show how user's private/sensitive information can be laid out on the user interface of the phone that has a bi-fold display (e.g., bi-fold display 220). In other words, the "actual UI" representations show exactly how the user interface appears look to the user when the foldable phone 230 is fully open in each of the scenarios. In comparison, the "as-seen-by-user UI" representations show how user's private/sensitive information visibly appears to the user on the user interface of the phone 230 when the bi-fold display 220 is folded at an optimum folding angle (and, in some embodiments, viewed from an optimum viewing angle) for each of the scenarios.

Take the first privacy scenario—a private space—as an example. The example UI 202 represents an actual UI rendering of the user's private/sensitive information on the phone 230 when the bi-fold display 220 of the foldable mobile phone 230 is fully open. In comparison, the UI as it appears to the user, example UI 201, shows how the actual UI 202 visually appears to the user when the two sections (i.e., the left and right sections) of the bi-fold display 220, i.e., fully open and occupying a full area of the foldable display 220. It is understood that the user would generally prefer to keep the foldable mobile phone 230 fully open in user's private space such as home, because it fully utilizes the display area of the foldable display 220. It should be noted that in a fully open state, the actual UI (i.e., example UI 202) is the same as the UI as it appears to the user (i.e., example UI 201) at the user's optimum viewing angle.

In the second example privacy scenario—an office cubicle—because it is a location that can generally be classified as relatively safe, but not as safe as the user's home, it may not be advisable for the user to keep the phone 230 fully open because there is still a small possibility that an onlooker may be looking at the user's phone. In such a case, keeping the phone 230 somewhat folded but at a wide angle may be sufficient in protecting the user's private/sensitive information from being stolen by the onlookers. The example UI 203 represents the actual UI rendering of the user's private/sensitive information on the phone 230 for the scenario when the user is located in a relatively safe space. In such an environment, an optimum view for the user can be achieved when the two sections of the bi-fold display 220 are folded to a wide angle (e.g., 135° or more). In comparison, the UI as it appears to user, example UI 203, shows how the actual UI 204 appears to the user when the two sections of the bi-fold display 220 folded to an optimum folding angle for a relatively (but not completely) safe space. It is also noted here that the as-seen-by-user UI 203 represents how the actual UI 204 appears to the user when the foldable mobile phone 230 is viewed from an optimum viewing angle (see above description with respect to FIGS. 1C-1D). The as-seen-by-user UI 203 is the user interface that looks smaller than the full area of the display (e.g., as compared to UI 201) but undistorted to the user at the optimum folding angle in a relatively safe space. In the meantime, the same user interface looks distorted to the onlookers (e.g., UI 204).

Similarly, in locations that can generally be classified as public but still quiet space—such as the third privacy scenario, a park—it may be advisable for the user to keep the phone folded 230 to a narrow angle, especially as compared to the second scenario when the user was located at a safer place like an office. This is because there is a greater possibility for onlookers to be looking at the user's phone in a park as compared to a safer place like an office. In such a case, keeping the phone folded at a narrow angle can protect the user's private/sensitive information from being stolen by the onlookers. The example UI 206 is the actual UI rendering of the user's private/sensitive information on the phone 230 for the scenario when the user is located in a public but still quiet space. In such an environment, an optimum view for the user can be achieved when the two sections of the bi-fold display 220 are folded to a narrow angle (e.g., 135°-75°). The as-seen-by-user UI 205 shows how the actual UI 206 appears to the user when the foldable mobile phone 230 is folded to an optimum folding angle for a public but still quiet space. In this manner, the as-seen-by-user UI 205 remains undistorted to the user at the optimum folding angle, even though the display area as perceived by the user has become smaller than a full area of the foldable display 220 (e.g., as compared to UI 201). The same user interface, however, becomes more hidden to the onlookers because of its narrower folding angle, and appears to the onlookers as even more distorted as compared to the second scenario.

Finally, in locations that can generally be classified as busy public spaces—such as the fourth privacy scenario, a bus or a subway—it may be advisable for the user to keep the phone 230 folded to an even narrower angle compared to the previous scenario (e.g., the park). This is because there is a much greater possibility for onlookers to be looking at the user's phone in a bus as compared to a park. In such a case, keeping the phone 230 folded at a much narrow angle can protect the user's private/sensitive information from being stolen by the onlookers. The example UI 208 is the actual UI rendering of the user's private/sensitive information on of the phone 230 for the scenario when the user is in a busy public space. In such an environment, an optimum view for the user can be achieved when the two sections of the bi-fold display 220 are folded to an angle (e.g., 75° or less) that is the narrowest in all four scenarios. The as-seen-by-user UI 207 shows how the actual UI 208 appears to the user when the foldable mobile phone 230 folded to an optimum folding angle for a busy public space. As shown in FIG. 2A, the as-seen-by-user UI 207 can remain undistorted to the user at the optimum folding angle, even though the display area as perceived by the user is the smallest of the all four (as compared to UIs 201, 203, and 205). As compared to the first three scenarios, however, example UI 208 is the most hidden to the onlookers because of the narrowest folding angle, and appears to the onlookers as the most distorted as compared to all previous scenarios. Note that, in the embodiments where a foldable display is configured to fold at or about the center (e.g., a bi-fold display configuration), the user interface implementing the present techniques (e.g., UIs 204, 206, and 208) may be symmetrically deformed about an axis along a hinge (e.g., axis 236) of the foldable display (e.g., display 220).

In this way, the disclosed UI manipulation/distortion techniques provide an intuitive user interface system, where the contents of the user interface can be visually distorted in the actual UI representation and can only appear undistorted and readable when the display(s) (e.g., display 220) is/are folded to a specific angle. This enables the protection of the user's private and sensitive information from being stolen by onlookers (e.g., onlookers 140) as the onlookers can only see the distorted user interface display, such as those examples shown as the actual UI representation (e.g., example UIs 204, 206, and 208). Additionally, the onlookers are further prevented from stealing user's private and sensitive information as the user folds or closes the display at a specific folding angle to block the view of onlookers when the user is viewing the readable UI, such as those examples shown as the as-seen-by-user UI representation (e.g., example UIs 203, 205, and 207).

Figure 2B:
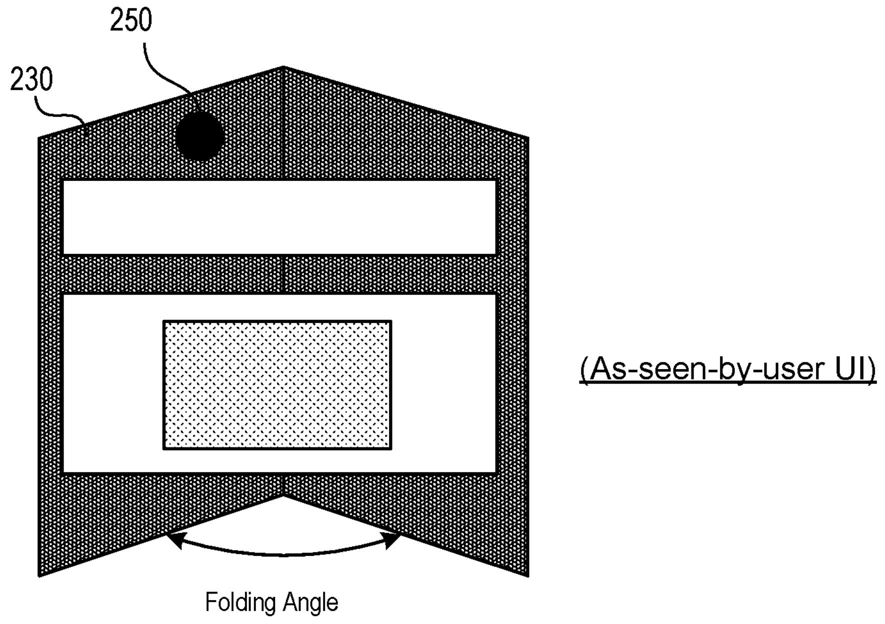
FIG. 2B illustrates an example of a visual guidance indicium and a textual guidance as they appear in an actual UI versus an as-seen-by-user UI.
Figure 2B:
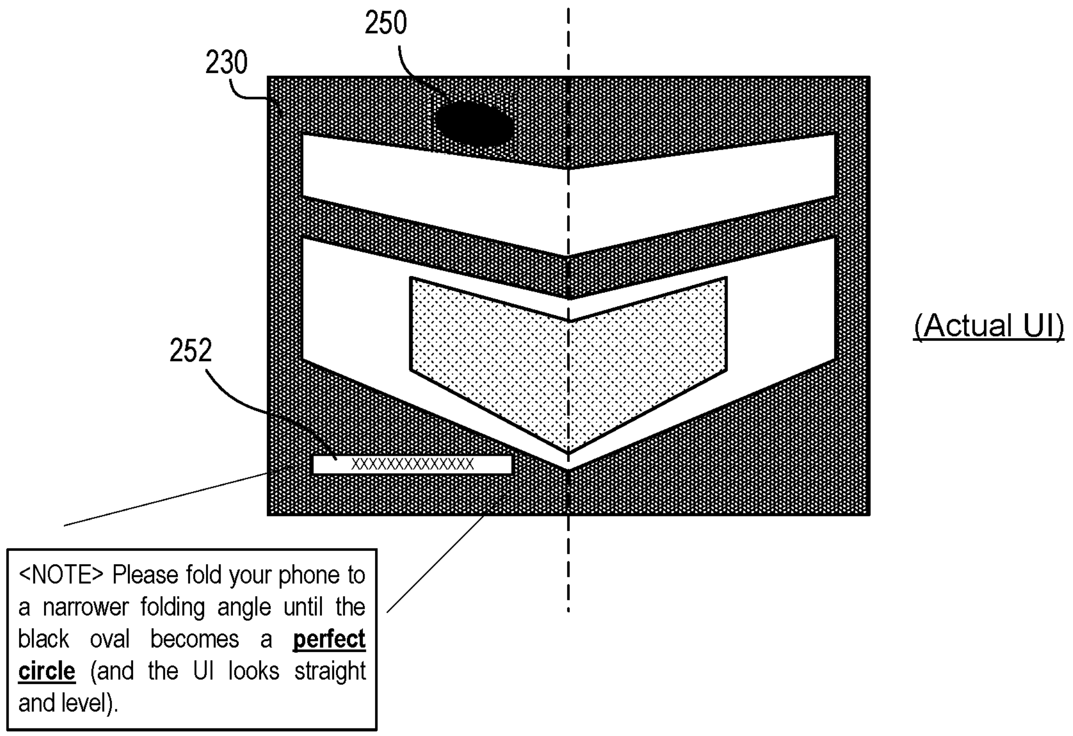

FIG. 2B illustrates an example of a visual guidance indicium 250 and a textual guidance 252 as they appear in an actual UI versus an as-seen-by-user UI. As discussed here, the UI to be displayed on the foldable or the flexible display can be generated based on a select folding angle, so that the UI would visually appear to the user as normal only when the foldable phone the screen is folded to the select folding angle. The UI generated from this technique is intuitive to the user, at least because the content would otherwise look abnormal (e.g., distorted or skewed) when the phone is not in the select configuration (e.g., folded to the select folding angle).

Nonetheless, to further enable the user to intuitively configure and/or orient the phone, and to reduce the reliance on distortion of the content being displayed for guiding the user, the generated UI can additionally include a visual guidance indicium (e.g., guidance indicium 250) that guides the user to manipulate the foldable display to the select folding angle. In some implementations, the visual guidance indicium 250 can be displayed at the top of the display or at a location where it would not hinder the normal content in the UI from the user. The visual guidance indicium 250 can be a select geometric shape, such as a circle, a square, a triangle, a diamond, etc. With the implementation of the disclosed UI manipulation techniques, the visual guidance indicium would appear to the user as the select geometric shape (e.g., the circle, such as shown in the "as-seen-by-user UI" representation in FIG. 2B) only when the foldable display is manipulated to the optimum folding angle. For example, when the select geometric shape is a circle, the actual UI may appear to the user as a shape other than the circle (e.g., a tilted oval, such as shown in the "actual UI" representation in FIG. 2B) when the foldable display is not manipulated to the optimum folding angle. In other words, the geometric shape on the intuitive user interface appears as a circle only when the foldable display is manipulated to the optimum folding angle. In some embodiments, the actual UI may include additional hint on the display that indicates to the user what the select geometric shape is (which can also be a part of the textual guidance 252, discussed below). Then, the user can adjust the phone to a narrower angle until the oval appears to be a circle. The user interface becomes readable and visually normal from the perspective of the user, but the content is otherwise blocked or visually distorted to the onlookers around the user.

Additionally, or alternatively, the generated UI can include a visual guidance indicium that guides the user to manipulate his or her grip in accordance with the grip manipulation technique discussed with respect to FIGS. 8-11D. Thus, in one or more embodiments, the generated UI may include a visual guidance indicium for the UI manipulation technique and a visual guidance indicium for the grip manipulation technique. However, the visual guidance indicia may be generated independent of one another. The visual guidance indicium for the grip manipulation technique may be generated independent of the UI manipulation technique (i.e., with no visual distortion) or in conjunction with the UI manipulation technique (i.e., with visual distortion).

In addition, or as an alternative, one or more embodiments of the UI manipulation system here may include a textual guidance (e.g., textual guidance 252) on the user interface to guide the user to change the current folding angle to the optimum folding angle. For example, the text guidance 252 can indicate to the user in words like "open the foldable display more" or "close the foldable display further." In some variations, the textual guidance can be displayed in currently-readable font (i.e., in non-distorted manner) as an instruction, e.g., "close the phone until the oval becomes a perfect circle."

In this fashion, the visual guidance 250 and/or textual guidance 252 can guide the user to fold the phone by just the right amount to make the user interface readable from the user's position, blocking the view of potential onlookers from the user's private information. As a practical example, a user wants to see their bank account information whilst sitting on the bus. When the user accesses the information on their foldable phone, the phone presents the user with a UI which appears distorted. At the top is an oval shape, and written in currently-readable font is an instruction: "Please fold your phone to a narrower folding angle until the black oval becomes a perfect circle (and UI looks straight and level)." The user closes the phone to a narrower angle to the phone until the oval appears as a circle. After the adjustment, the user interface is now perfectly readable from the user's position, but contents on which are now blocked to potential onlookers.

Further, in some examples, the UI manipulation system can require the user device be placed into the optimum configuration before the sensitive information can be shown on the UI to the user. For example, the UI manipulation system can be configured to show only the assistive UI elements and actively block, blur, mask, otherwise hinder, or simply prohibit the display of the sensitive data on the screen of the user device unless/until the foldable display is manipulated to the optimum device configuration (e.g., the optimum folding angle). For example, the UI can only show guidance information (e.g., visual indicium 250 and/or textual guidance 252) to the user until the user follows the guidance instructions and reconfigure or manipulate the foldable phone to the select optimum folding angle. Only then does the UI manipulation system show the sensitive information on the UI (e.g., in the manners described above).

Figure 2C:
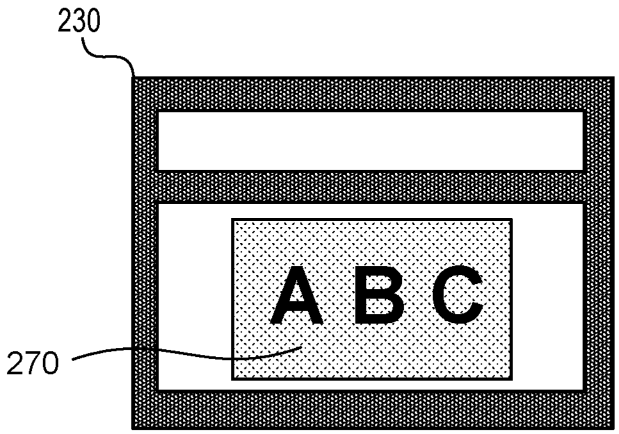
FIG. 2C illustrates additional implementational details for some examples of the introduced foldable phone UI manipulation techniques.
Figure 2C:
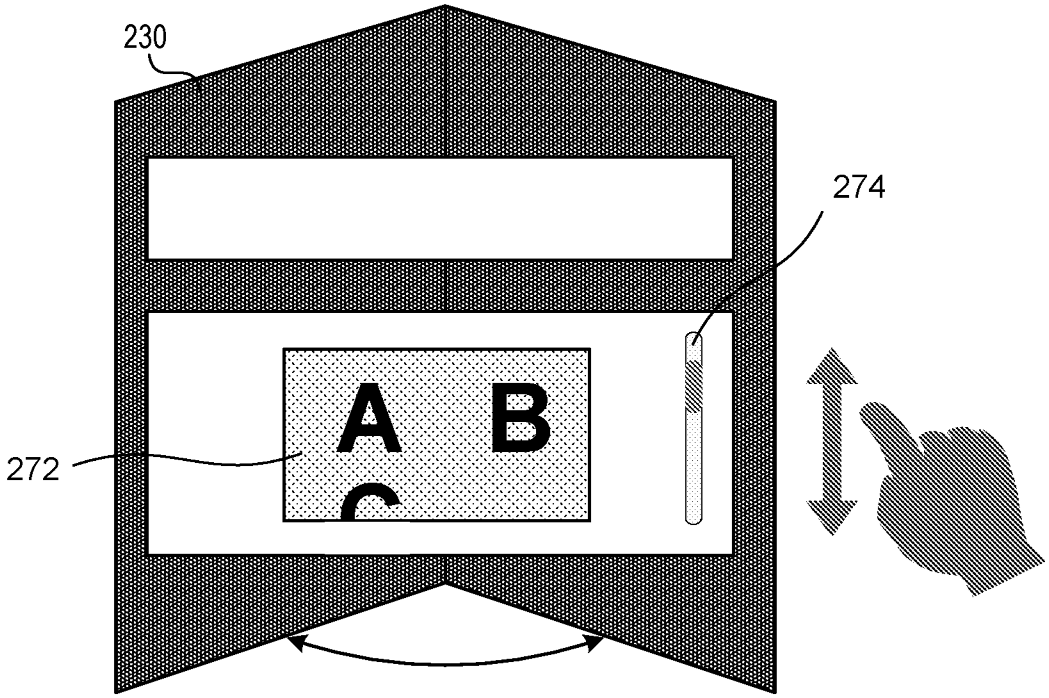

FIG. 2C illustrates additional, optional implementational details for some examples of the foldable phone UI manipulation techniques. As is discussed here, because at least a number of examples of the introduced UI manipulation techniques have the visual effect of reducing or shrinking the display area of the foldable display as perceived by the user (e.g., comparing UI 201 against UIs 203, 205, and 207), in some implementations, the content of the display can be automatically adjusted based on the determined effective form factor for the foldable display. Specifically, in various embodiments, the original layout of the sensitive information can be changed or rearranged to an alternative layout in accordance with the determined form factor, such that the alternative layout that is suitable for a smaller form factor as compared to the full area of the foldable display. For example, the original layout (e.g., which may be designed for a larger display, like a desktop/tablet display) can be changed to an alternative layout (e.g., which may have a different font size, graphics, and/or navigational arrangement) that is designed for a mobile device with a small or smaller screen.

Shown in FIG. 2C are two example UIs 270 and 272, where the example UI 270 shows an original layout of the content to be displayed when the screen is fully open. When the device implementing the UI manipulation techniques is folded, the displayed layout can be automatically changed to an alternative layout, which is demonstrated by the example UI 272. Additionally, or alternatively, additional UI elements, such as a scroll bar 274, can be further added to the displayed UI to assist the user in navigating the content in the simulated, reduced screen size.

Example System Components and Data Flow

Figure 3:
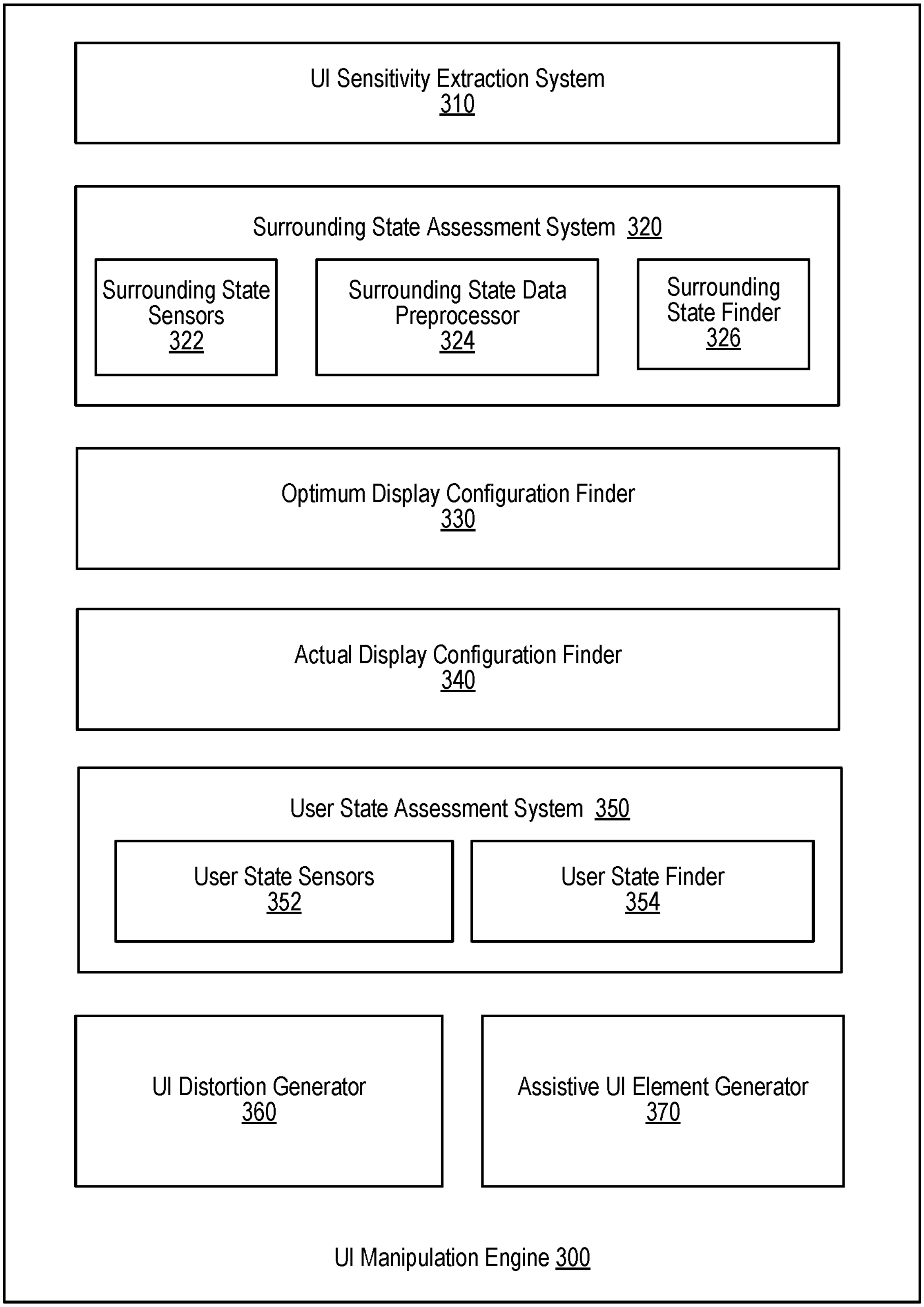
FIG. 3 illustrates a functional block diagram of an example UI manipulation engine that can be utilized to implement the foldable phone UI manipulation techniques.

FIG. 3 illustrates a functional block diagram of an example UI manipulation engine 300 that can be utilized to implement the foldable phone UI manipulation techniques introduced here.

The example UI manipulation engine 300 can be implemented in and run on a mobile device of a user (e.g., mobile device 130, 230). As illustrated in FIG. 3, the UI manipulation engine 300 can include a UI sensitivity extraction system 310, a surrounding state assessment system 320, an optimum display configuration finder 330, an actual display configuration finder 340, a user state assessment system 350, a UI distortion generator 360 and an assistive UI element generator 370. Note that the components shown in FIG. 3 are merely illustrative; certain components that are well known, e.g., central processor units (CPUs), memory modules, screen display(s), and communication circuitry, are not shown for simplicity. Note that one or more systems, subsystems, components, and/or modules introduced here may be implemented as or include a software application; however, any suitable combination of these systems/subsystems/modules could be implemented as a hardware or a firmware component to achieve the same or similar functions. Similarly, example components in FIG. 3 are shown for purposes for facilitating the discussion herein; more or fewer components may be used, and components may be combined or divided, depending upon the actual implementation.

According to some implementations, the UI manipulation engine 300 can start when it receives an indication that sensitive information is to be to display (e.g., on a foldable display of a mobile device). For example, an application programing interface (API) can be implemented for the engine 300 such that it can receive a software function call (e.g., from a software application) as an instruction. In variations, the engine 300 can be implemented as a part of a function set provided by the operating system (OS), or in a system software library, etc. In additional or alternative embodiments, the engine 300 can be a standalone software residing in the memory and intercepts/detects sensitive information to be displayed.

After receiving the indication that there is the sensitive information to be displayed, the UI manipulation engine 300 determines an optimum display configuration for it, and in order to do so, the engine 300 takes into consideration one or more factors, including those based off of external and/or internal information. More specifically, in accordance with the introduced UI manipulation techniques, there are generally two categories of information that can affect the determination of how small the perceived display screen should be reduced (i.e., the form factor thereof): (1) those pieces of information that are internal to the phone, and (2) those that are external to the phone. The former (i.e., the internal information) can be extracted by the UI sensitivity extraction system 310, and the latter (i.e., the external information) can be extracted by the surrounding state assessment system 320.

A. UI Sensitivity Extraction System

Figure 4A:
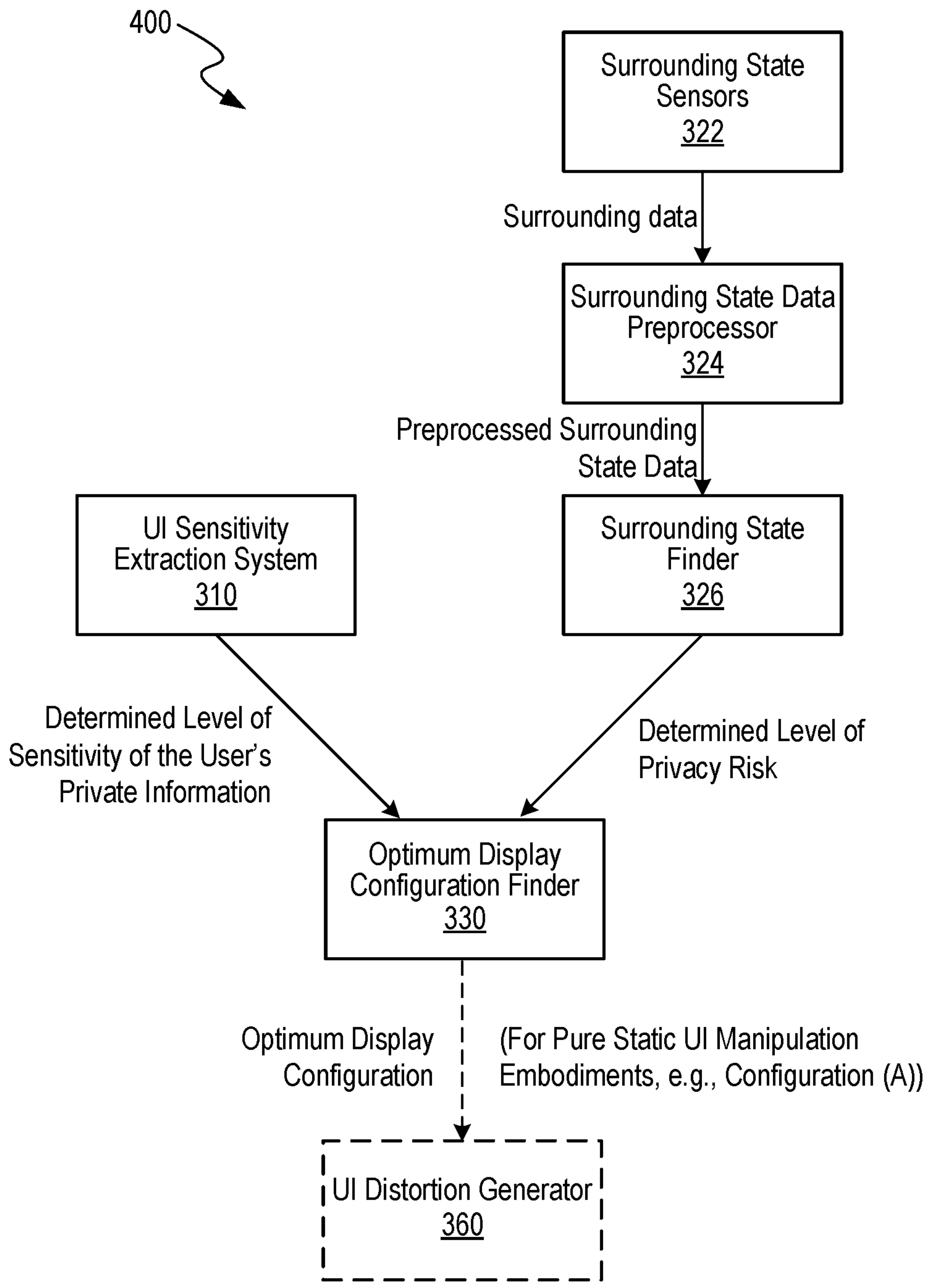
FIG. 4A illustrates an example data flow diagram for implementing the foldable phone UI manipulation techniques with some example components of the UI manipulation engine in FIG. 3.

FIG. 4A is an example data flow 400 for implementing the foldable phone UI manipulation techniques using some example components of the UI manipulation engine in FIG. 3. The data flow 400 illustrates an example of how data can flow between various blocks in a UI manipulation system (e.g., engine 300). With simultaneous reference to FIGS. 3 and 4A, the data flow 400 is now explained together with the functional block diagram of the UI manipulation engine 300.

The UI sensitivity extraction system 310 can determine the privacy sensitivity of data being displayed on the user device, and output UI sensitivity data. In other words, the UI sensitivity extraction system 310 can determine a level of sensitivity of the information to be presented on user's mobile device.

In some examples, the UI sensitivity data may describe various sensitivity levels of different features that are currently displayed on the screen. High sensitivity item examples may include password entry boxes, bank account information, credit card information, and so forth. Depending on the implementation, medium sensitivity can include personal information, such as social security number, birthday, home address, or telephone number. The UI sensitivity extraction system 310 can also identify low sensitivity items, such as public domain information, generic website text, or images. In a number of embodiments, the user can have the option to adjust or edit these items to the user's own preference. Additionally, or alternatively, the UI sensitivity data may describe an overall sensitivity rating for the screen matched to the highest sensitivity feature on the page.

According to some embodiments, the UI sensitivity extraction system 310 can obtain the UI sensitivity data from a local resource and/or a remote resource. Examples of these resources may include a look-up table or a database, where a sensitivity rating for commonly seen software applications/components/functions can be recorded. For example, the resource(s) may identify as high sensitivity: if a software mobile application is a banking application, if an application window shows a password entry screen, if a webpage that provides a certain function (e.g., viewing bank statements) is triggered, or if an UI element contains a password entry field. As an additional or alternative embodiment, the UI sensitivity extraction system 310 can obtain the UI sensitivity data through metadata, e.g., message metadata relating to who the sender is, metadata regarding the nature of the message, message urgency, and/or the receiver's address (such as differentiating sensitivity based on work or private email). Further, in some variations where an API is implemented for the UI manipulation engine 300, the UI sensitivity extraction system 310 can receive the UI sensitivity data from the API (e.g., via one or more parameters in the function call).

In one or more embodiments, the UI sensitivity extraction system 310 can obtain the UI sensitivity data through content analysis. In certain examples, the UI sensitivity extraction system 310 can determine the level of sensitivity based on the presence of keywords in messages sent or received (e.g., "highly confidential"), or through analyzing graphic/photographic contents (e.g., by employing known image processing and recognition algorithms). Some embodiments of the UI sensitivity extraction system 310 can also generate UI sensitivity data by using machine learning techniques (e.g., supervised machine learning). For example, the UI sensitivity extraction system 310 can be first trained by a set of training data which has its sensitivities labeled to establish a UI sensitivity determination data model. Examples of the training data can include actual contents (e.g., texts, documents, pictures, or videos) and their corresponding sensitivity ratings. In this manner, the UI sensitivity extraction system 310 can generate the sensitivity rating of a sensitive UI content on the fly.

Even further, some variations of the UI sensitivity extraction system 310 can generate UI sensitivity data through user emotion analysis, such as by inferring the likely sensitivity from mood changes in the user. For example, if the user acts more secretive, changes facial expressions, mood, etc., as the user operates the application, the UI sensitivity extraction system 310 may infer the level of that application's sensitivity as higher than a typical application. These inferential sensitivity level determinations can be based on, e.g., gesture recognition, facial expression recognition, and/or electroencephalography.

B. Surrounding State Assessment System

The surroundings state assessment system 320 includes a suite of system hardware, firmware, and/or software components that can be used to determine and analyze the privacy state of the user's surroundings. As shown in FIG. 3, the surrounding state assessment system 320 includes three example components: surrounding state sensors 322, a surrounding state data preprocessor 324, and a surrounding state finder 326.

More specifically, the surrounding state assessment system 320 can be used, e.g., based on readings from the surrounding state sensors 322, to identify a level of privacy risk in a surrounding environment of the mobile device. This identified privacy risk level can be used by the optimum display configuration finder 330 and the UI distortion generator 360 to determine the optimum form factor of the user's private/sensitive information to be displayed on the mobile device. In some embodiments, the form factor of the user's private/sensitive information to be displayed on the mobile device can be inversely correlated to the identified level of privacy risk. That is, the higher the identified level of privacy risk is, the smaller the form factor of the as-seen-by-user UI should be. For example, as explained with respect to FIG. 2A above, there can be four levels of privacy risks-private space, relatively safe space, public but still quite space, and busy public space—and the busier the surrounding is, the smaller the UI as perceived by the user should become.

The surrounding state sensors 324 can include one or more sensors that may be used to obtain information (namely, the "surrounding data") about the user's surroundings. In various examples, the surrounding data may include visual images or recordings of the user's location, specific geographical location information (e.g., global positioning system (GPS) coordinates), audio information (e.g., background sound data and/or voice data from the surroundings), device connectivity information (e.g., information for detecting devices of people in the user's vicinity, such as connectivity data), and/or other suitable data that may be used to determine the presence and state of people around the user. In order to obtain applicable surrounding data, examples of the surrounding state sensors 324 can include sensors such as: rear and/or front-facing cameras, or other light-based (e.g., infrared) imaging technologies, that can generate optical feed from the user's location, a GPS sensor that can generate satellite positioning information, a microphone or audio sensor that can generate audio signals collected from the user's location, and/or a wireless network transceiver (e.g., Bluetooth) that can generate device signatures within the vicinity (e.g., 10 meters, based on the range of the transceiver) of the user's mobile device. Depending on the embodiment, these sensors may be on board the user's mobile device or can be connected to the device separately.

Specifically, according to one or more embodiments, the surrounding state sensors 322 can then transmit the surrounding data to the surrounding state data preprocessor 324, which can preprocess the surrounding data (e.g., to increase the signal-to-noise ratio (SNR) to an appropriate quality) for subsequent analyses. Further, the surrounding state data preprocessor 324 may apply various applicable types of preprocessing to the surrounding data depending on the type of data gathered. For example, in some embodiments, the surrounding state data preprocessor 324 may preprocess the optical data generated from the optical sensors (e.g., cameras) in the surrounding state sensors 322 to correct for scene illumination, focus, vibration, motion artifacts, reflections, and other features. Moreover, in a number of these embodiments, the surroundings state data preprocessor 324 can preprocess the optical data to identify and label (e.g., by adding metadata or tags to) key features, such as people or faces, using machine vision techniques.

In addition, some implementations of the surrounding state data preprocessor 324 can preprocess audio data to remove background noise (e.g., wind or road noise), amplify specific audio features (e.g., voices), and further improve the audio quality by enhancing the SNR. Similar to the video preprocessing embodiments mentioned above, in certain embodiments, the surrounding state data preprocessor 324 may preprocess the audio data to add metadata or tags to key features, such as distinct voices or overheard phrase-words.

Still further, in certain embodiments, the surrounding state data preprocessor 324 can preprocess connectivity data to identify, count, and potentially locate unique device signatures in the user's vicinity. For example, the surrounding state data preprocessor 324 can utilize information included in Wi-Fi management frames, requests, beacons, and pings in order to identify, count, and/or locate unique device signatures and/or geographical locations. The surrounding state data preprocessor 324, in some examples, can also preprocess GPS/satellite data to identify certain qualitative properties (e.g., shop name, road name, or landmarks) of the place within which the user is currently located. These GPS/satellite/locational data can be considered in combination with an existing mapping service (e.g., Google Maps) on the phone. Depending on the implementation, preprocessing of locational data may utilize machine learning techniques (e.g., to filter and categorize features).

Next, the surrounding state finder 326 can assess the current state of the user's surroundings (that is, the "surrounding state") by analyzing the preprocessed surrounding data produced by the surrounding state data preprocessor 324. Thereafter, the surrounding state finder 326 can determine the level of privacy risk in the user's surroundings based on the surrounding state of the user. In one or more implementations, the surrounding state finder 326, in determining the surrounding state, can extract relevant information from the surrounding data.

Particularly, in one or more examples, the surround data can include the number other people nearby (e.g., onlookers). In some of these examples, the surrounding state finder 326, in determining the number of other people nearby, can perform a count of feature tags of different people added to a camera feed during the preprocessing by the surrounding state data preprocessor 324. In other embodiments, the surrounding state finder 326 can determine the number of other people nearby by using machine vision face recognition techniques to count number of nearby users. In variations, the number of other people nearby can be determined by counting the number of nearby devices detected via Bluetooth technology (or other suitable short-range wireless connectivity technology). Additionally, or alternatively, the surrounding state finder 326 can determine the number of onlookers by counting the number of unique human voices identified during surrounding data preprocessing. Certain variants of the embodiments can provide, in the surrounding data, a simple estimation of total sound level in surroundings based on audio peak amplitude changes over a given time interval.

Further, in some embodiments, the surrounding data may include spatial distribution and gaze direction of nearby people. In some of these examples, the surrounding state finder 326 can detect this information by using camera data and machine vision techniques, e.g., in order to identify that someone is standing behind the user and facing towards the user device (which would be a security threat), as opposed to someone that is standing to the left or right of the user but perhaps facing away from the user device (which would be less of a security threat). In a number of implementations, the surrounding data may include known properties associated with the user's location, e.g., predicting how busy/public the user location is based on a predictive assessment of the user's GPS coordinates. For example, the surrounding state finder 326 can detect from the GPS data of the user device that the user is in a public place, thereby inferring that other people are likely to be nearby. In another example, the surrounding state finder 326 may find, through the GPS data, that the user is in a field of a large state park, and therefore infer that other people are unlikely to be nearby. In some embodiments, the surrounding state finder 326 may further associate known properties of the user's location from user device's network connections. For example, when the user device connects to "Home Wi-Fi" or "Car Wi-Fi", the surrounding state finder 326 may determine the privacy level to be high (i.e., risk level to be low); in contrast, when the user device connects to "Public Wi-Fi" or "Airport Free Wi-Fi," the surrounding state finder 326 may determine the privacy level to be low (i.e., risk level to be high).

Based on the surrounding state data and through the example manners described above, the surrounding state finder 326 can produce a surrounding state output that indicates how likely it is that the user's data might be exposed when using the user device. In other words, the surrounding state output from the surrounding state finder 326 can convey the level of privacy risk in the user's surroundings to the other components of the UI manipulation engine 300. In some embodiments, the communication of the surroundings state to subsequent system components may be in the form of a specific description of a number of persons presenting a data exposure risk to the user, including their locations, gaze angles, distances to the user, among other information. In variations, the communication of the surroundings state to subsequent system components may be in the form of a generic metric for user risk (e.g., the "data exposure risk"), where the surrounding state finder 326 can apply weightings to aspects of the analyzed surroundings data to determine the likelihood that the user's data may be exposed in the current location. In some additional or alternative examples, the surrounding state finder 326 can directly generate a rating or a level of privacy risk of the user's surroundings.

C. Optimum Display Configuration Finder

The optimum display configuration finder 330 can determine the optimum physical configuration of a folding or flexible screen (i.e., the "optimum display configuration") to prevent observation by other nearby people. Specifically, the optimum display configuration finder 330 can use (1) the level of sensitivity of the private and sensitive information presented on user's mobile device, and/or (2) the level of privacy risk of user's surrounding environment, to identify a physical configuration at which the probability of the screen's content being viewed by unscrupulous onlookers is reduced, minimized, or even eliminated. In other words, the optimum display configuration finder 330 can use the UI sensitivity data (e.g., generated by the UI sensitivity extraction system 310, described above) and/or the surrounding state (e.g., generated by the surrounding state assessment system 320, also described above) to determine the optimum privacy configurations (e.g., folding angle) of the display, such as to prevent the screen's contents from being misappropriated by the onlookers.

Specifically, in some embodiments, the optimum display configuration finder 330 can determine an optimum folding angle based on information internal to the user device, i.e., the determined level of sensitivity of the user's private information, which is produced by the UI sensitivity extraction system 310. In some other embodiments, the optimum display configuration finder 330 can determine an optimum folding angle based on information external to the user device, i.e., the determined level of privacy risk, which is produced by the surrounding state assessment system 320. Additionally, or alternatively, the optimum display configuration finder 330 can determine an optimum folding angle based on both the determined level of sensitivity of the user's private information and the determined level of privacy risk. For those embodiments that practice static viewing angle adjustment, the optimum display configuration finder 330 can further determine an optimum viewing angle.

Then, some embodiments of the optimum display configuration finder 330 can determine an optimum folding angle, that is, an optimum interior angle at which the display is folded (see FIG. 1B and related description above). For those embodiments where the display of the user device contains a single articulation (e.g., a singly hinged display or displays), the optimum display configuration can be the optimum folding angle at which the display is folded. For example, an acute folding angle may provide greater viewing privacy (at the expense of the reduced perceived size of display) and is optimal for high privacy risk area and/or high sensitivity content; conversely, an obtuse folding angle may provide lower viewing privacy while providing larger perceived size of display, and is best for low privacy risk area and/or low sensitivity content.

The optimum display configuration can vary with the physical characteristics of the user device. For example, in some embodiments, the device may be a device with two or more folding sections that are designed with specific predetermined folded configurations. In such a device, the angle and rotational direction of screen folding may be restricted, and as such, the optimum display configuration may be, for each folding section, a combination of a folding angle plus a certain rotational direction vector. Further, in certain examples, the device may be a device with a generically flexible display fabric. Such a device may be a single piece folding screen with dynamically configurable folding behavior that is not limited to a predetermined folding behavior. In such a device, the angle and the rotational direction of screen folding are less restricted. As such, the optimum display configuration may include a specific, select shape, and the configuration may further include, e.g., a direction to which the screen should be folded as well as a location of the center of the fold (e.g., such as a folding line) on the screen surface. This folding angle and folding line combination can, e.g., be utilized by the assistive UI element generator 370 (discussed below) to guide the user to fold the display fabric to the select shape. In this context, many examples of the folding line can be similar to the hinge axis introduced here for a foldable (e.g., bi-foldable) display.

Note that, in some examples, data from accelerometer/gyroscope sensors built in to the user device may be used to identify how the user is currently holding the device, and through which, the optimum display configuration finder 330 can determine whether an optimum folding angle may be physically achievable by folding one or both sides of the device.

After the optimum display configuration is determined, it can be output by the optimum display configuration finder 330. For the pure static UI manipulation embodiments (i.e., those where the UI does not morph/change with changes in the actual folding angle or the location of the user's eye), e.g., configuration (A) discussed above, the optimum folding angle and/or viewing angle can be output to the UI distortion generator 360 for UI rendering and display.

D. Actual Display Configuration Finder

Figure 4B:
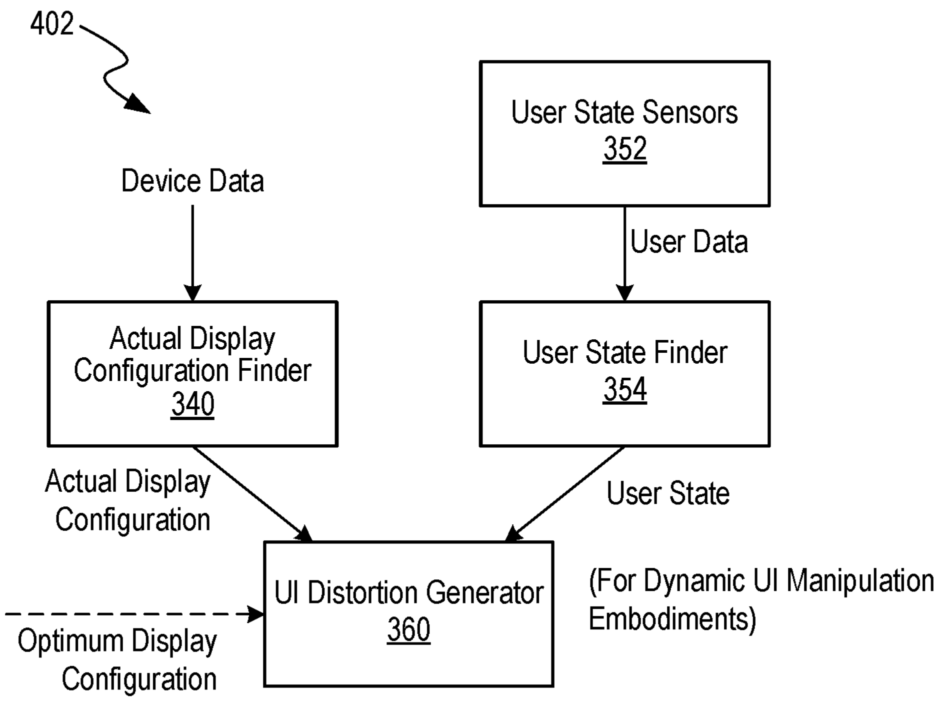
FIG. 4B illustrates another example data flow diagram for implementing the foldable phone UI manipulation techniques with some example components of the UI manipulation engine in FIG. 3.

FIG. 4B is an example data flow 402 for implementing the foldable phone UI manipulation techniques using some example components of the UI manipulation engine in FIG. 3. The data flow 402 illustrates an example of how data can flow between various blocks in a UI manipulation system (e.g., engine 300). With simultaneous reference to FIGS. 3 and 4B, the data flow 402 is now explained together with the functional block diagram of the UI manipulation engine 300.

As previously introduced, a number of embodiments of the disclosed UI manipulation techniques employ dynamic UI manipulation, i.e., where UI distortion changes or morphs when the actual gaze point of the user changes (e.g., in configuration (B)) or when the actual folding angle of the user device changes (e.g., in configuration (C)), or both (e.g., in configuration (D)). One or more system components (e.g., the actual display configuration finder 340, or the user state assessment system 350) upon which these embodiments rely as basis for their dynamic UI adjustment are introduced below.

The actual display configuration finder 340 can determine the current configuration (or, the "actual display configuration") of the user device. For example, the actual display configuration finder 340 can determine the actual display configuration by using device data obtained from one or more display configuration sensors built into the device. Examples of the information obtainable from these display configuration sensors can include: current folding angle and/or folding direction configuration, device position, and/or device orientation (e.g., tilt angle). In some examples, the device orientation can be obtained by data from accelerometer, gyroscope, or other suitable sensors that are onboard the user device. These data may be used to identify how the user is currently holding the device and/or how the user should move the mobile device to achieve optimum viewing angle (e.g., for embodiments where the viewing angle adjustment is static).

In some embodiments, the display configuration sensors used by the actual display configuration finder 340 to gather the device data may include mechanical sensors. For example, in a two-panel (e.g., two-section or bi-fold) flexible display, mechanical sensors may be incorporated into the hinge joining the two panels. In certain examples, the sensor can include a flexible electronic material that changes resistance as the hinge closes and opens, which can in turn enable the folding angle of the screen to be measured. The folding angle data may be used to identify how the foldable screen is currently folded and/or how the user should reconfigure the foldable screen to achieve optimum folding angle (e.g., for embodiments where the folding angle adjustment is static).

For generically flexible displays (e.g., a fabric display), some embodiments of the actual display configuration may include the distortion of the display at points across the display's surface with a high enough density in order to describe the surface distortion across the entire surface. For example, in a number of these embodiments, the actual display configuration can include data representing, for each point on the surface, a vector field with a scalar quantity of distortion amplitude and angle of distortion.

Moreover, some variations of the display configuration sensors can also include one or more cameras. For example, in a generically flexible display embodiment, optical data gathered from a camera (which can be built into the device or from a third-party device) can be used by the actual display configuration finder 340 to create a normal map or vector field of the current device surface. In some additional or alternative embodiments, the camera(s) can also be used by the actual display configuration finder 340 to determine relative device orientation and estimate spatial location of the device. Additionally, in some embodiments, the actual display configuration finder 340 can utilize camera data and image processing techniques to capture the actual display configuration in 3D, which can result in a 3D model file, e.g., an STL file.

In a variety of implementations, the display configuration sensors can include time-of-flight (ToF) sensors that measure a distance to an object using the time it takes for light to travel to and get reflected back from the object. For example, a built-in ToF sensor may be used by the actual display configuration finder 340 to obtain device position by performing measurement of the distance between the device and people or other physical features. Additionally, or alternatively, the display configuration sensors may include a radar. For example, radar or other object or motion sensing technologies can be used by the actual display configuration finder 340 to determine the spatial relationship between display elements, or between a display element and the user.

E. User State Assessment System

The user state assessment system 350 can be a suite of system components used to determine and analyze the physical state of the user. The user state assessment system 350 can include example components such as user state sensors 352 and a user state finder 354.

The user state sensors 352 include one or more sensors which may be used by the user state assessment system 350 to obtain data about the user's state (or "user state"). More specifically, examples of the user state that can be acquired by the user state sensors 352 can include: a user gaze point-which is the location on the screen at which the user is focusing; a head angle-which is the angle of the user's head with respect to the display; a viewing angle-which is the angle of the user's eye with respect to the display; and/or a head orientation-which is the user's whole body orientation with respect to the display. Depending on the implementation, the user state sensors 352 can be a dedicated, eye tracking sensor system, or can be a combination of the sensors on board the user device. Example components of the user state sensors 352 can include, e.g., one or more front-facing cameras, motion sensors (which may be on the user device or be worn by the user, like a smart band), suitable projectors, and/or time-of-flight sensors. For example, the projectors can project a specific light or light pattern (e.g., infrared or near-infrared light) on the eyes of the user, the cameras can take images of the user's eyes and the pattern, and then image processing and machine vision techniques may be applied to determine the user's eyes' positions and gaze point. In another example, the time-of-flight sensors can detect the user's distance from the screen.

F. UI Distortion Generator

The UI distortion generator 360 generates a visual distortion (also referred to here as the "UI distortion," "UI deformation," or "UI manipulation") in the user interface. The UI distortion manipulates the visibility of the displayed UI so that the optimum view of the user interface can be obtained only from the user's current perspective at the optimum display configuration (e.g., at the optimum folding angle). The visibility of the display from any other onlooker's perspective is both reduced (because of the closed folding angle) and obscured (because of the visual distortion), such that the onlookers are less likely to steal user's private information from the user device by overlooking.

Depending on the implementation, the UI Distortion can include a combination of different transformations and distortions. For example, the UI Distortion may include a series of transformations (e.g., translation, rotation, or skew) to be applied to the user interface. According to a number of the present embodiments, the UI distortion generator 360 can apply an "optical illusion" to the user interface (e.g., such as those discussed in FIG. 2A) that can render the UI and the targeted information on the UI readable only from desired angles and/or distances. For certain embodiments with "holographic display" hardware, the UI distortion generator 360 can generate a set of instructions including, e.g., to which angles the pixel light of different pixels should be adjusted, such that privacy sensitive UI elements can only be viewable from certain angles and/or physical device configurations. As discussed above with respect to FIG. 2A, the distortion type and degree of distortion factor in the level of sensitivity of the information being displayed. Transformations or distortions applied to highly sensitive UI content can be more extreme such that the UI contents are much less readable to those outside of target user (e.g., UI example 207, as compared to UI example 203).

In certain examples, the UI distortion generator 360, in determining and generating the UI Distortion, takes into consideration the user state data and/or the actual display configuration. For example, using the user state data (e.g., user gaze point), the UI distortion generator can adjust the viewing angle of the UI distortion so that it remains viewable to the user when the user's eye location moves. Using the actual display configuration, a number of embodiments of the UI distortion generator 360 can also continuously modify the UI distortion in response to any change in the folding angle. In this manner, the form factor (e.g., size) of the perceived UI that is generated through the UI distortion can be updated and adjusted (e.g., in a real-time or near real-time manner) in response to the new actual display configuration and/or user state.

In addition, some embodiments of the UI distortion generator 360 can generate instructions for device hardware to compensate for the actual display configuration. In some implementations, the UI distortion generator 360 may generate instructions to increase pixel brightness in certain portions of UI elements to be viewed, e.g., in order to compensate for visual deterioration due to viewing the screen at the outer edges of the viewing cone. In other variations, the UI distortion generator 360 may generate instructions for recalibration of device's 3D control gestures, such that the gestures can still work in the new aspect ratio, UI positioning, UI element distortions, etc., in the new UI.

Further, for improved user experience and usability, some embodiments of the UI distortion generator 360 can modify one or more features of the UI. For example, the UI distortion generator 360 may modify user interface feature dimensions. Additionally, or alternatively, the UI distortion generator 360 can modify the positioning of UI elements on the display. For example, the UI distortion generator 360 may move elements away from the edge of the display to the center to reduce amount of distortion necessary on extreme folds. In some embodiments, the UI distortion generator 360 may modify a number of user interface features including, e.g., color, brightness, or pixel distribution. In some examples, the UI distortion generator 360 can rearrange UI to a layout more suitable to a smaller display (i.e., as perceived by the user) when the device is closed to a narrower folding angle (such as the example discussed above with respect to FIG. 2C).

G. Assistive UI Element Generator

Figure 4C:
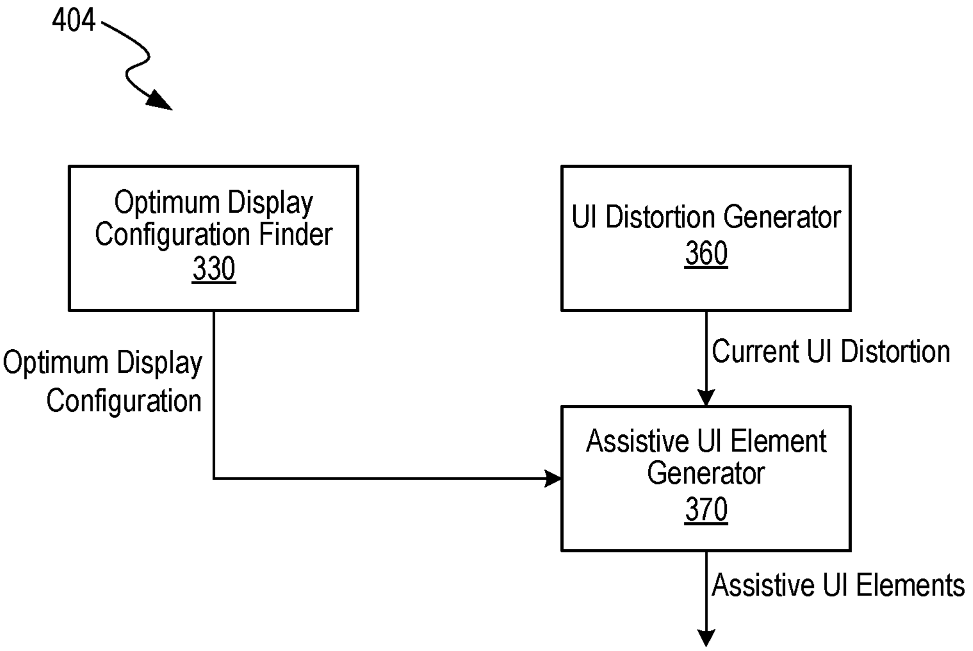
FIG. 4C illustrates yet another example data flow diagram for implementing the foldable phone UI manipulation techniques with some example components of the UI manipulation engine in FIG. 3.

FIG. 4C is an example data flow 404 for implementing the foldable phone UI manipulation techniques using some example components of the UI manipulation engine in FIG. 3. The data flow 404 illustrates an example of how data can flow between various blocks in a UI manipulation system (e.g., engine 300). With simultaneous reference to FIGS. 3 and 4C, the data flow 404 is now explained together with the functional block diagram of the UI manipulation engine 300.

The assistive UI element generator 370 can generate a UI element or feature, and/or a hardware enabled feature (e.g., a standalone LED indicator), that may be used to guide the user to achieve the optimum display configuration. More specifically, in some examples, the assistive UI element generator 370 can choose to display one or more assistive UI elements (e.g., by using the UI distortion from the UI distortion generator 360 and/or the optimum display configuration parameters from the optimum display configuration finder 330), such that the features of the assistive UI element can change to indicate to the user when the user has manipulated the folding screen correctly and achieved the optimum display configuration (e.g., the optimum folding angle).

More specifically, in some embodiments, the assistive UI elements may include dimensional changes to shapes or patterns which the user may intuitively understand, such as the distortion to the UI itself and/or an additional visual guidance indicium (e.g., a select geometric shape). For example, the assistive UI elements may include a distorted circle (or an oval, e.g., indicium 250 of FIG. 2B) that becomes perfectly round only when the screen is changed to the optimum display configuration. In some examples, an additional textual guidance can be generated on the display that indicates to the user what the select geometric shape is (e.g., a circle). In order to provide more useful assistance to the user, one or more embodiments provide that this additional textual guidance be displayed in an orientation that the user can view even without (or before) the device is configured (e.g., folded) to the optimum display configuration (e.g., at the optimum folding angle)—such an example is shown as textual guidance 252 in FIG. 2B. The content of the textual guidance, in some implementations, can be generated based on a difference between the actual display configuration (e.g., the current folding angle) and the optimum display configuration (e.g., the select folding angle). For example, the text guidance can instruct the user to change folding angle, i.e., more open or close. In some examples, as an alternative to a geometric shape, a picture can be used.

As an additional embodiment, the assistive UI elements can include a hardware enabled feature, such as an LED indicator when the display is in the optimum display configuration. In variations, a holographic display indicator can be included, which can appear the correct color or brightness when the display is in the optimum display configuration. In addition, or as an alternative, the assistive UI elements may include a pattern of pixels, or points of illumination, that would only appear as certain shape or picture once the display is in the optimum display configuration. For example, in a fabric-like display, pixels may only appear as a machine-readable, one- or two-dimensional barcode (e.g., a QR code) when the fabric is manipulated into the optimum shape, thereby acting as a confirmation that the optimum display shape is achieved.

Furthermore, in some variants, the assistive UI element generator 370 can show only the assistive UI elements and actively block, blur, mask, otherwise hinder, or simply prohibit the display of the sensitive data on the screen of the user device unless/until the foldable display is manipulated to the optimum device configuration (e.g., the optimum folding angle). For example, the assistive UI element generator 370 can control the UI distortion generator 360 such that the UI that shows the sensitive material is blocked, and only show guidance information (e.g., visual indicium 250, textual guidance 252 (in FIG. 2B), and/or the LED indicator mentioned above) to the user; then, only when the user follows the instructions and change the foldable phone to the select optimum folding angle does the UI manipulation engine 300 show the sensitive information on the UI (e.g., in the manners described above with respect to FIG. 2A).

Methodology

Figure 5:
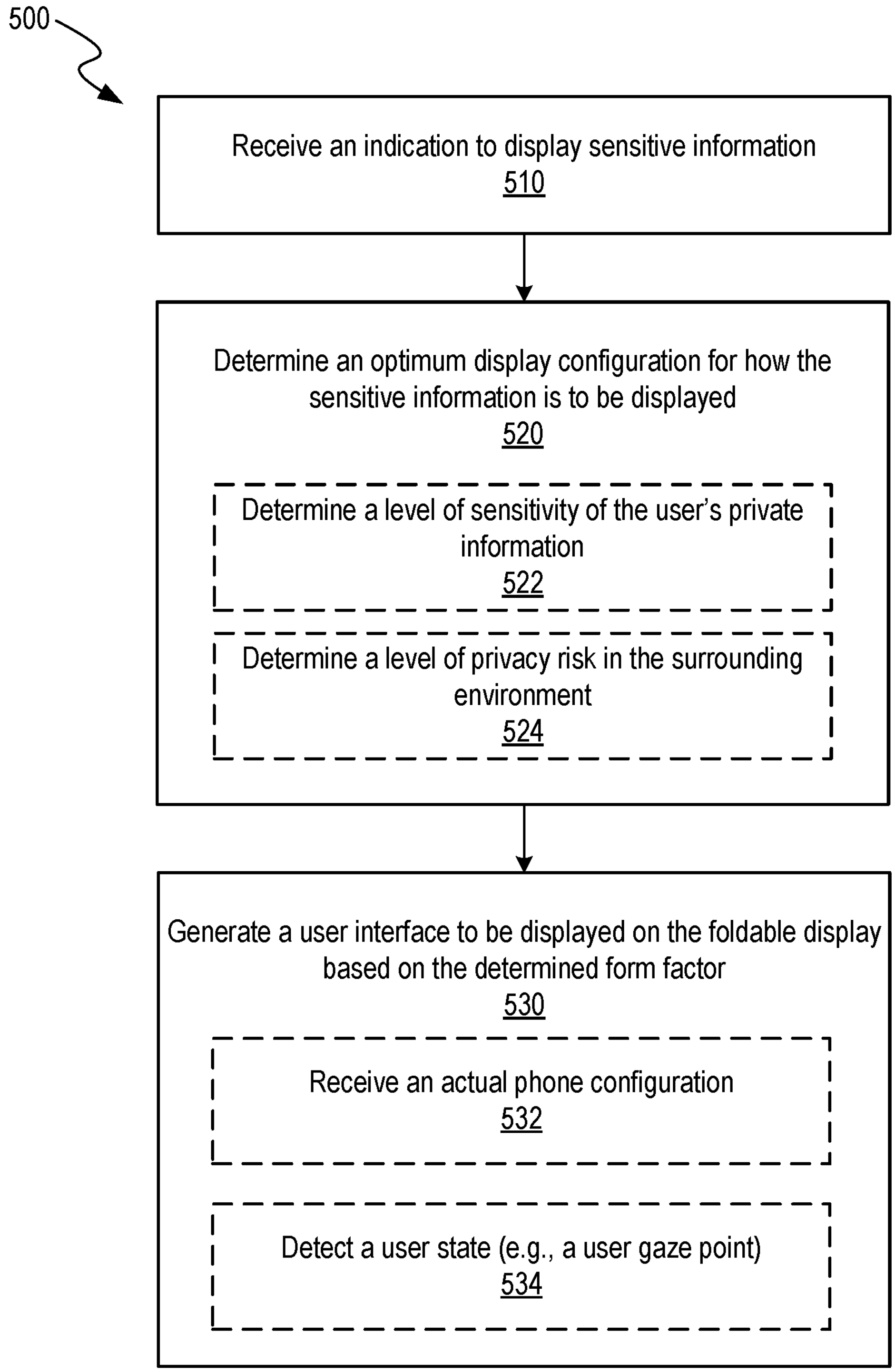
FIG. 5 illustrates a flowchart showing an example method for implementing the foldable phone UI manipulation techniques.

FIG. 5 illustrates a flowchart showing an example method 500 for implementing the foldable phone UI manipulation techniques. The method 500 can be implemented by various components (e.g., components 310-370; FIG. 3) of a UI manipulation engine (e.g., engine 300; FIG. 3) for UI distortion and rendering on a user device (e.g., device 130, 230; FIGS. 1A, 2A) to protect sensitive, private information and data on a foldable UI display against onlookers. The method 500 is introduced with simultaneous reference to FIGS. 2A-2C and FIG. 3.

First, the UI manipulation engine can receive (510) an indication to display sensitive information on a display (e.g., display 220) of a mobile device (e.g., device 230). An example of such an indication can be a software function call. In some examples, the mobile device can include a foldable display. Then, the UI manipulation engine can determine (520) an optimum display configuration for how the sensitive information is to be displayed. In a number of embodiments, the UI manipulation engine first identifies (522) a level of sensitivity of the information to be displayed on the user's screen, and then determines a form factor for how the sensitive information is to be displayed. Additionally, or alternatively, the UI manipulation engine, in determining the form factor for the perceived UI, can determine (524) a risk of privacy (or how busy) in the surrounding environment of the user device. The form factor, like discussed above, can generally include a perceived display size, that is, after UI distortion techniques, the size of the display that is viewed by the user when the user manipulates (e.g., folds) the device into the optimum device configuration (e.g., by folding a bi-foldable display to an optimum folding angle). Generally, the higher the level of sensitivity of the data to be displayed, or the higher the privacy risk the surrounding environment is, the smaller the perceived form factor (e.g., size) of the displayed UI becomes. That is to say, the form factor can be inversely correlated to the risk from the surrounding environment and/or the sensitivity of the data to be displayed. In accordance with one or more embodiments of the disclosed UI manipulation techniques, the determined form factor is smaller than a full area of the foldable display, e.g., for privacy scenarios where onlookers may be present.

Next, the UI manipulation engine can generate (530) the UI to be displayed on the foldable display based on the determined form factor. For example, the UI manipulation engine can receive (532) the actual phone configuration, and the UI to be displayed by the UI manipulation engine is to show the sensitive information in the form factor (e.g., the perceived size) but visually deformed to a user unless the foldable display is manipulated to a select, physical phone configuration (e.g., either a select folding angle and/or, in some embodiments, a select viewing angle). As shown in the example UIs in FIG. 2A, in foldable-display embodiments, the UI can be collectively displayed by a plurality of sections of the foldable display. In certain implementations, the foldable display can be a bi-fold display.

Specifically, in one or more embodiments with a foldable display, the UI distortion is generated such that, unless display sections of the mobile device are folded to the folding angle, the user interface appears distorted to the user. That is to say, after an optimum folding angle is determined, unless the display sections of the mobile device are folded to the folding angle, the user interface appears distorted to the user. In one or more examples, the UI is symmetrically deformed about an axis along a hinge of the foldable display (e.g., as is with those UI examples 204, 206, and 208). In other examples, the UI distortion engine can receive, e.g., from one or more orientation sensors on the mobile device, a current orientation status of the mobile device, and further adjust the UI in response to the received current orientation status of the mobile device.

Further, in some embodiments, the UI manipulation engine can detect (534) a user state which, e.g., can be a user gaze point. Based on the user state, the UI manipulation engine can (e.g., in those embodiments that practice dynamic view angle adjustment) determine a viewing angle for which, unless the mobile device is oriented to the viewing angle relative to the user, the user interface appears distorted to the user. In some of these examples, the UI manipulation engine can determine a location of an eye of the user and adjust the UI in response to the detected location of the eye of the user. In certain implementations, the UI manipulation engine can employ a user-facing eye detector on the mobile device, and further adjust the UI so that a new optimum viewing angle for the UI reflects the detected location of the eye of the user.

Figure 6:
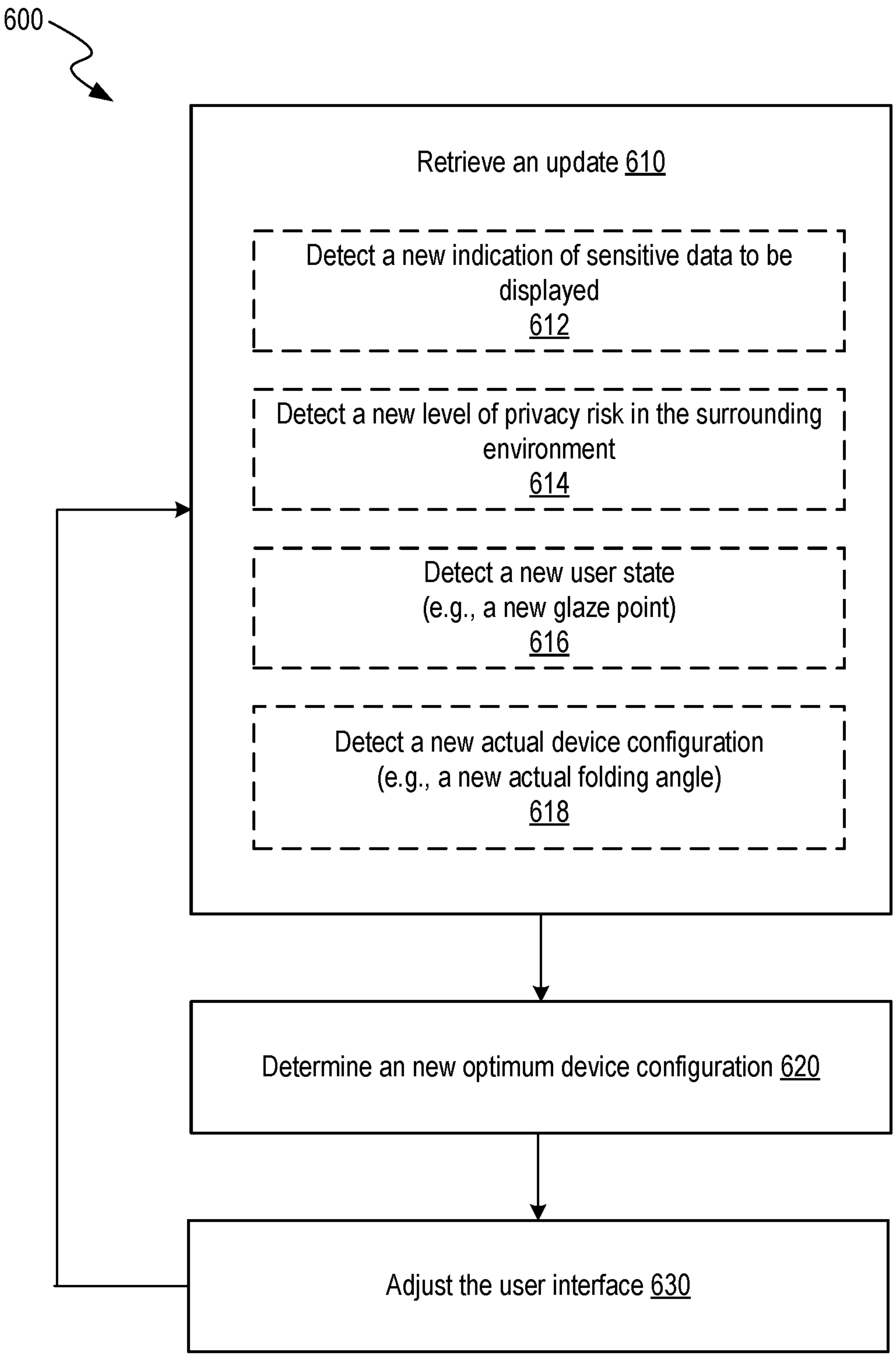
FIG. 6 illustrates a flowchart showing another example method for implementing the foldable phone UI manipulation techniques.

FIG. 6 illustrates a flowchart showing another example method 600 for implementing the foldable phone UI manipulation techniques. The method 600 can be implemented by various components (e.g., components 310-370; FIG. 3) of a UI manipulation engine (e.g., engine 300; FIG. 3) for updating the UI distortion and rendering on a user device (e.g., device 130, 230; FIGS. 1A, 2A) in order to protect sensitive, private information and data on a foldable UI display against onlookers. The method 600 is introduced with simultaneous reference to FIGS. 2A-2C and FIG. 3.

The UI manipulation engine can perform an update of the UI distortion upon receiving or retrieving (610) an update (e.g., a current folding angle) on the actual, current physical configuration of the user device. More specifically, depending on the embodiment, the UI manipulation engine can detect one or more of the following new pieces of information: it can detect (612) a new indication of sensitive data to be displayed; it can detect (614) a new level of privacy risk in the surrounding environment of the user device; it can detect (616) a new user state (e.g., a new gaze point or a new eye location of the user); and/or it can detect (618) a new actual device configuration (e.g., a new actual folding angle or a new device orientation).

Then, consistent with the manners discussed above (e.g., with respect to FIG. 3), the UI manipulation engine may determine (620) a new optimum device configuration. In some examples, when there is a new or an update level of sensitive data for display (612), and/or when there is a new level of privacy risk in the surroundings (614), the UI manipulation engine can determine (620) a new optimum device configuration (e.g., a new optimum folding angle and/or, in some embodiments, a new optimum viewing angle). Further, for those that implement dynamic viewing angle adjustment, when there is a new user state (e.g., a new gaze point) detected (616), the UI manipulation engine needs to determine (620) a new optimum device configuration (e.g., a new viewing angle) for UI distortion generation. Similarly, for those that implement dynamic folding angle adjustment, when there is a new actual device configuration (e.g., a new actual folding angle) detected (618), the UI manipulation engine needs to determine (620) a new optimum device configuration (e.g., a new folding angle) for UI distortion generation.

Thereafter, the UI manipulation engine adjusts (630) the UI in accordance to the updated, new optimum device configuration. In one or more implementations, the UI distortion updates are performed substantially in real time as the user manipulates the folding display. In one or more examples, select steps in the steps 610-630 can be repeatedly or recursively performed.

Working Example

Figure 7A:
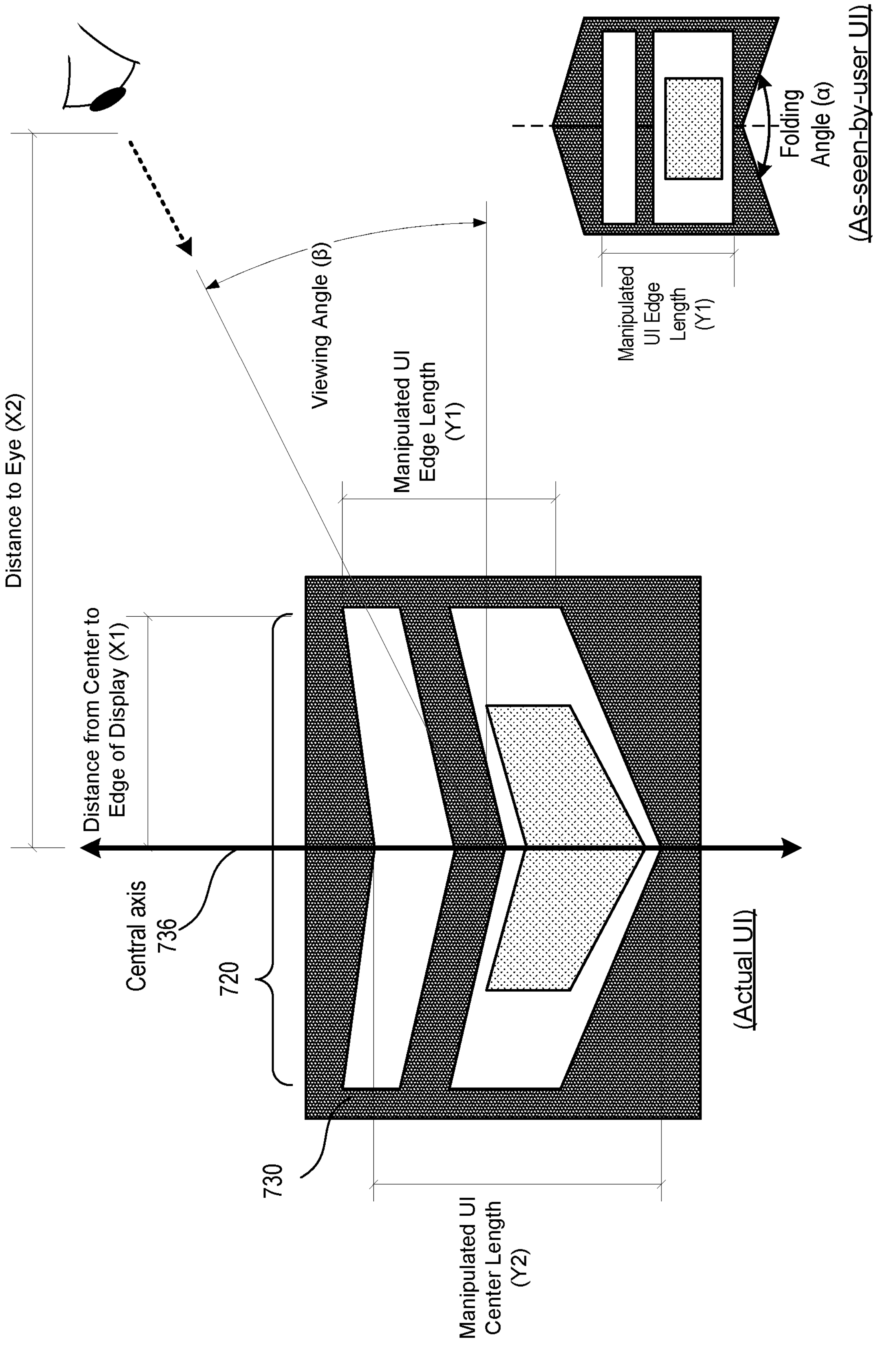
FIG. 7A illustrates a more detailed example of how a distorted UI can be generated in some embodiments of the foldable phone UI manipulation techniques.

FIG. 7A illustrates a more detailed example of how a distorted UI can be generated (e.g., by the UI distortion generator 360; FIG. 3) on a bi-fold display (e.g., display 120, FIG. 1A; 220, FIG. 2A) of a foldable screen device (e.g., device 130, FIG. 1A; device 230, FIG. 2A). More specifically, after the UI form factor for how the sensitive information is to be displayed is determined (e.g., as described above with respect to FIG. 3), the actual UI to be displayed on the foldable display is generated based on the determined form factor. In order to determine how the UI is to be distorted and displayed, provided in the following are equations and explanations of an example method to calculate the UI transformations given the above input parameters in FIG. 7A.

As shown in FIG. 7A, a mobile device 730 includes a bi-foldable display 720 that folds about a central axis 736 (e.g., a hinge). In the following example calculation, assume that the distance ($X_1$) from the central axis 736 to the edge of the bi-foldable display 720 is known. Further, assume that the distance ($X_2$) from the central axis 736 to the eye of the user can be detected (e.g., based on a sensor, such as an eye tracker and/or a ToF sensor, which may be onboard the device 730) and/or estimated. Finally, in the example illustrated in FIG. 7A, the folding angle is represented by (a), and the viewing angle is represented by (P).

Figure 7B:
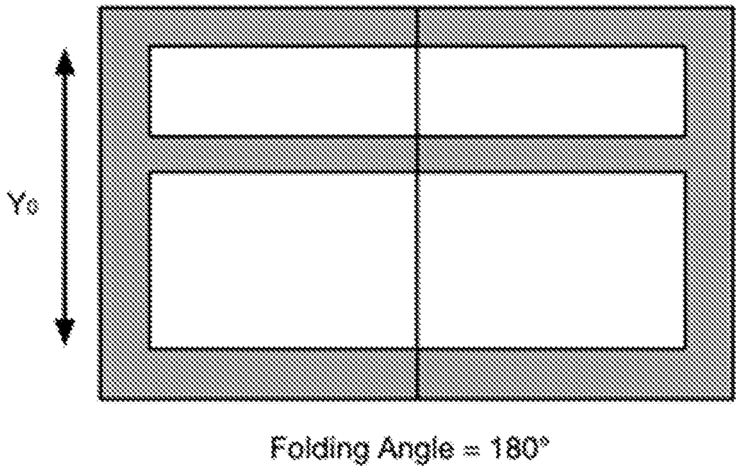
FIG. 7B illustrates an additional assumption of the calculation in the example of FIG. 7A.

Let ($Y_1$) be the resulting length of the edge of the manipulated UI, and ($Y_2$) be the resulting length of the center of the manipulated UI (as shown in FIG. 7A). Let ($Y_0$) be the initial length of the edge of the original, undistorted UI (as shown in FIG. 7B). The relationship among $Y_0$, $Y_1$, and $Y_2$ can be represented by the following transformation:

$$\begin{bmatrix} Y_1 \\ Y_2 \end{bmatrix} = T_1\begin{bmatrix} Y_0 \\ Y_0 \end{bmatrix} + T_2\begin{bmatrix} Y_0 \\ Y_0 \end{bmatrix} \quad \text{Eq. (1)}$$

where $T_1$ is the transformation due to an alteration of the folding angle $\alpha$, and is a function of $\alpha$, $X_1$, and $X_2$. $T_2$ is the transformation due to an alteration of the viewing angle $\beta$, and is a function of $\beta$, $X_1$, and $X_2$. Note that, unlike the folding angle $\alpha$, the viewing angle $\beta$ can have three components, as the angle can be variable in three dimensions, and therefore $T_2$ can be represented by:

$$T_2 = T_{2xy} + T_{2yz} + T_{2zx} \quad \text{Eq. (2)}$$

That is, one transformation for rotations in each of the three orthogonal planes. Also, note that $Y_0=Y_1=Y_2$ when $\alpha=1800$ and $\beta=0°$.

Figure 7C:
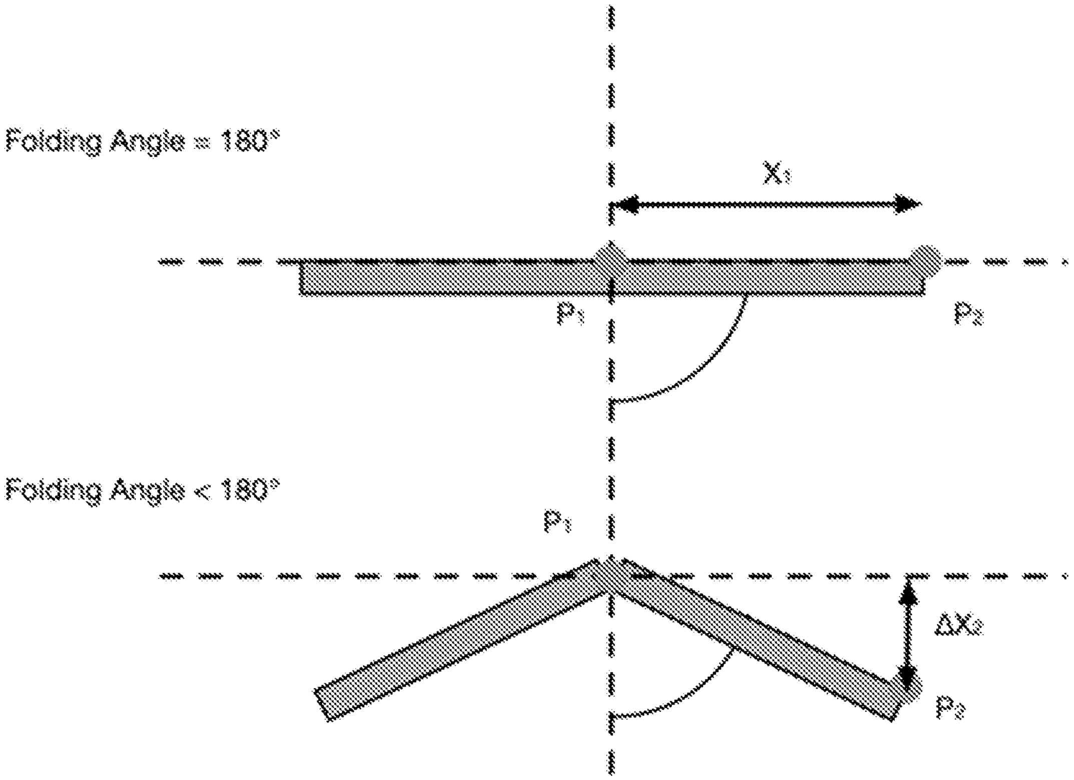
FIG. 7C illustrates an example transformation calculation due to an alteration of the folding angle in the example of FIG. 7A.

FIG. 7C illustrates an example transformation calculation due to an alteration of the folding angle $\alpha$ in the example of FIG. 7A. Specifically, the following provides an example method of calculation in $T_1$.

With continued reference to FIGS. 7C and 7A, if the viewing angle $\beta$ is assumed to be constant, then point $P_1$ (at the center of the display, where the center axis or the hinge is) of FIG. 7C is assumed static with respect to the original plane of device. Assume that the device's thickness is negligible as compared to $\Delta X_2$, then transformation $T_1$ can be applied to compensate for the increase in perceived change in the height of UI features at point $P_2$ (at the edge of the display) from the perspective of viewer at distance $X_2$.

With this coordinate system, the size of UI features at the center, folding axis ($P_1$) (e.g., axis 736) of the display remains unchanged, so $Y_2=Y_0$, and $T_1$ need not be applied to the UI features at the center axis.

For determining a UI feature at point $P_2$ (e.g., of an initial height $Y_0$) at a distance $X_1$ away from the origin, the transformation $T_1$ can be applied to compensate for the perceived increase in size due to the feature being closer to the viewer by an amount $\Delta X_2$. Therefore, a transformation can be applied to the feature at $P_1$ (assuming of a height of $Y_0$) to get the smaller height $Y_1$. Such a transformation can be denoted by:

$$Y_1 = \left(\frac{X_2 - \Delta X_2}{X_2}\right)Y_0, \quad \text{Eq. (3)}$$

where $$\Delta X_2 = X_1 \sin\left(90° - \frac{\alpha}{2}\right) \quad \text{Eq. (4)}$$

As such, based on this example coordinate system in FIG. 7C, the transformation $T_1$ can be represented by:

$$T_1 = \begin{bmatrix} \left(\frac{X_2 - \Delta X_2}{X_2}\right) \\ 1 \end{bmatrix} \quad \text{Eq. (5)}$$

Figure 7D:
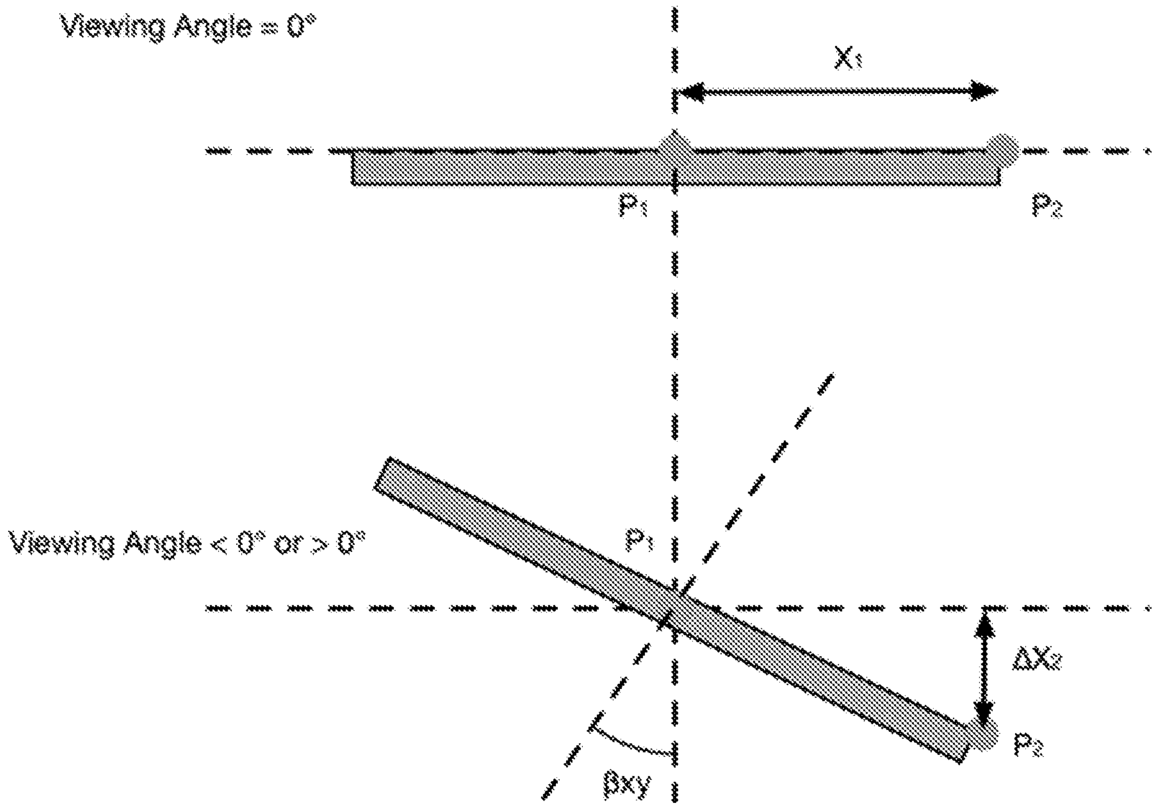
FIG. 7D illustrates an example transformation calculation due to an alteration of the viewing angle in the example of FIG. 7A.

FIG. 7D illustrates an example transformation calculation due to an alteration of the viewing angle $\beta$ in the example of FIG. 7A. Specifically, the following provides an example method of calculation in $T_2$.

With continued reference to FIGS. 7D and 7A, if the folding angle $\alpha$ is assumed to be constant, then point $P_1$ (at the center of the display, where the gaze point is) of FIG. 7D is assumed static with respect to original plane of device. Assume that the device's thickness is negligible compared to $\Delta X_2$, then transformation $T_2$ can be applied to compensate for increase in perceived change in the height of UI features at point $P_2$ (at the edge of the display) from the perspective of viewer at distance $X_2$.

There are three components to the viewing angle $\beta$ in the three-dimensional (3D) space, one each for rotations in the xy-plane, the yz-plane, and the zx-plane. Each can be considered independently, but similar equations can be applied for calculation.

With the above coordinate system, the size of UI features at the center axis ($P_1$) remains unchanged, such that $Y_2=Y_0$, and $T_2$ need not be applied to the UI features at the center.

For a UI feature at point $P_2$ (e.g., of an initial height $Y_0$) at a distance $X_1$ away from the origin, the transformation $T_2$ can be applied to compensate for perceived increase in size due to the feature being closer to the viewer by an amount $\Delta X_2$. Therefore, a transformation can be applied to the feature at $P_1$ (assuming of a height $Y_0$) to get the smaller height $Y_1$:

$$Y_1 = \left(\frac{X_2 - \Delta X_2}{X_2}\right) Y_0, \quad \text{Eq. (6)}$$

where $$\Delta X_2 = X_1 \sin(\beta_{xy}) \quad \text{Eq. (7)}$$

Therefore, based on the example coordinate system in FIG. 7D, the transformation component $T_{2xy}$ can be represented by:

$$T_{2xy} = \begin{bmatrix} \left(\frac{X_2 - \Delta X_2}{X_2}\right) \\ 1 \end{bmatrix} \quad \text{Eq. (8)}$$

Similar transformations may also be applied for the other components of β: $\beta_{yz}$ and $\beta_{zx}$, leading to transformation components $T_{2yz}$ and $T_{2zx}$, which in turn be used to represent transformation $T_2$ (using Eq. (2)).

Figure 7E:
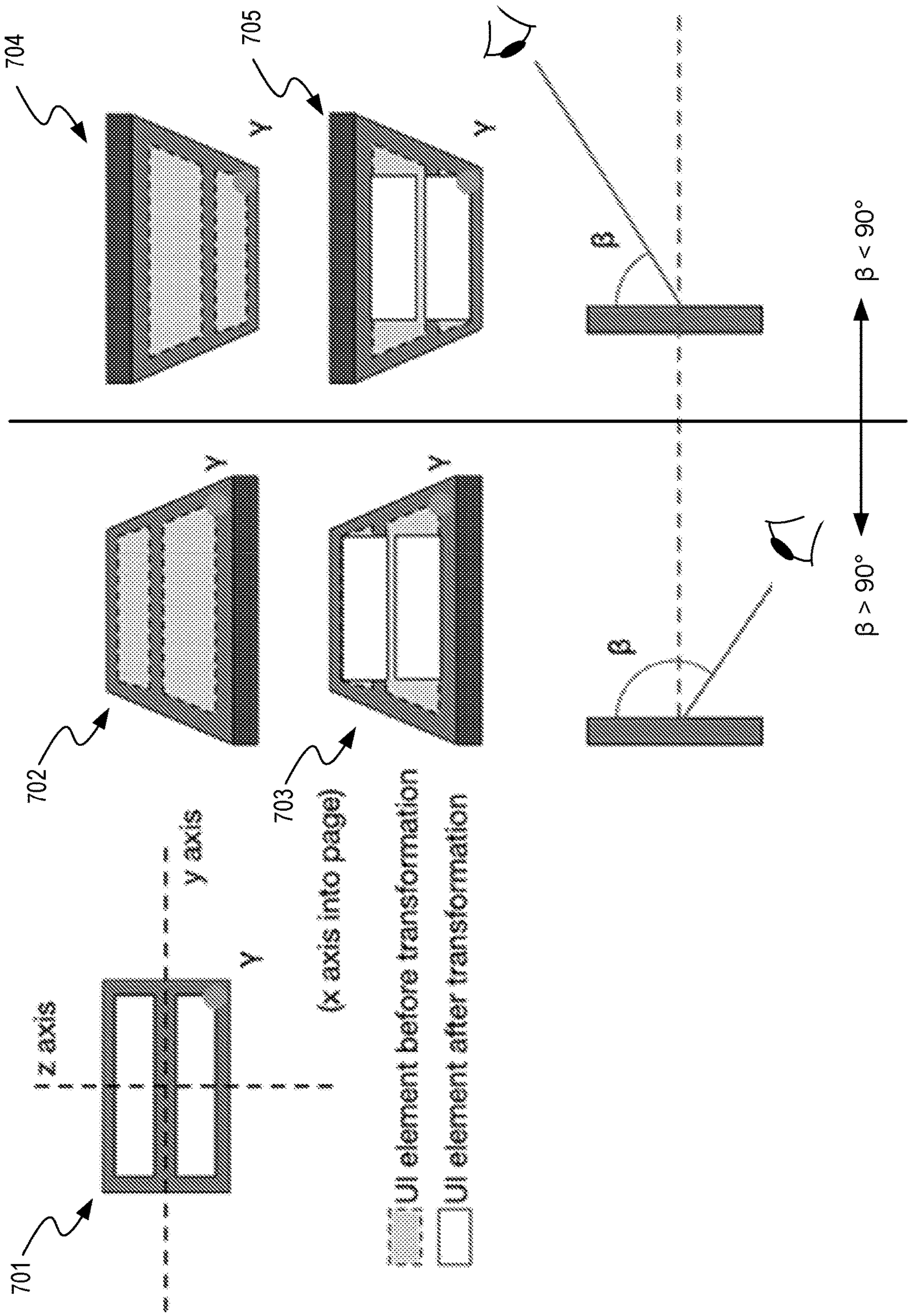
FIG. 7E illustrates an example of how a UI can adjust to compensate for angular distortion (e.g., how tilted) in the actual, generated UI in response to a change in the viewing angle.

FIG. 7E illustrates an example of how a UI can adjust to compensate for angular distortion (e.g., how tilted) in the actual, generated UI in response to a change in the viewing angle. First, shown in FIG. 7E is an example UI 701 showing what the UI elements should visually appear to the user (e.g., as determined by the optimum display configuration finder 330, FIG. 3). The example UI 701 can be displayed on a flat section of a display, e.g., which can be one section of the display sections that together form the foldable display discussed here. For simplicity of the discussion, the following explanation will focus on the angular distortion adjustment of a single section; however, the same technique can be similarly applied to multiple sections of a foldable display. Assume that the UI 701 is displayed on the yz-plane, and the x axis extends into the page that shows FIG. 7E. As illustrated, the UI 701 includes a corner, marked by a round dot and visually should form a right (e.g., 90°) angle. The following discussion will utilize this corner to explain how an example angular distortion adjustment can be performed in response to a change in the view angle β. Assume the angle formed by this corner is (γ).

Further shown in FIG. 7E are example UIs 702, 703, 704, and 705. The example UIs 702-703 illustrate when the display section is viewed by the user from an acute viewing angle β (i.e., less than 90°), and the UIs 704-705 illustrate when the display section is viewed by the user from an obtuse viewing angle β (i.e., more than 90°). It is observed here that, if without any compensation to a change in the viewing angle, then the corner angle γ becomes an acute angle (as opposed to a right angle in the UI 701) when the display section is viewed from an obtuse viewing angle β, such as shown in the example UI 702. Similarly, if without any compensation to a change in the viewing angle, then the corner angle γ becomes an obtuse angle (as opposed to a right angle in the UI 701) when the display section is viewed from an acute viewing angle β, such as shown in the example UI 704.

Therefore, according to at least some embodiments (e.g., those that practice dynamic viewing angle UI adjustment, discussed above), the UI can be receive angular distortion adjustments (e.g., change in tilt angles, like in corners of a box UI element) to account for a perceived change in tilt angles due to a change to the user's viewing angle. With the viewing angle UI adjustment, the angular distortion due to viewing angle change can be compensated for, such as shown in example UIs 703 and 705. In other words, some embodiments disclosed here can adopt a mechanism for determining how much these tilt angles in UI need to be adjusted based on a change in viewing angle β.

Specifically, in some examples, from the perception of the user, the corner angle γ can change with the viewing angle β based on a hyperbolic tangent function (which is also known as the "tan h( )" function). That is to say, in certain embodiments, the relationship between the displayed corner angle γ and the viewing angle β can be described based on a tan h( ) based formula, for example:

$$\gamma = \alpha \tan h(-b\beta + c) + d \quad \text{Eq. (9)}$$

Figure 7F:
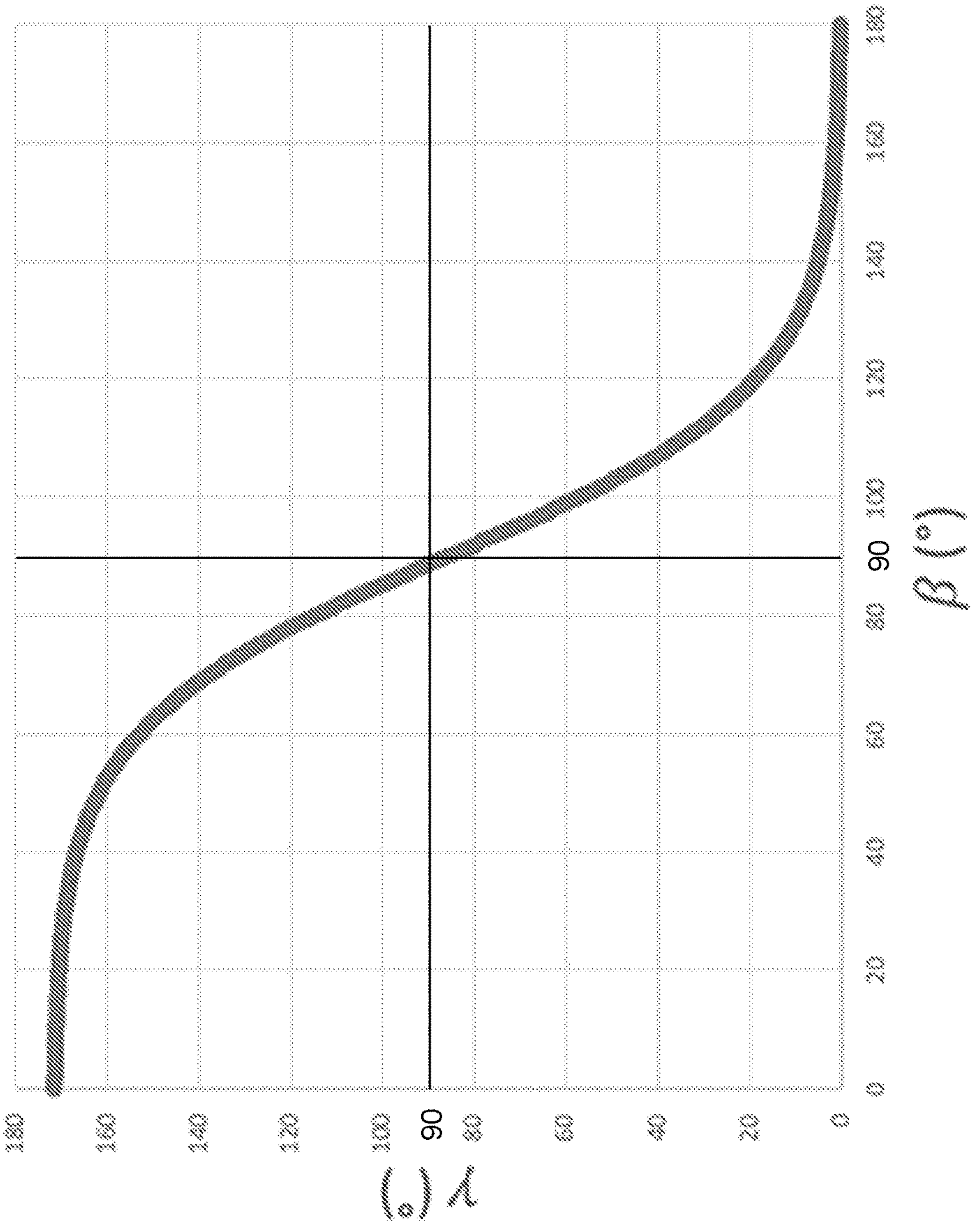
FIG. 7F illustrates an example relationship between the amount of angular distortion adjustment and the change in the viewing angle.

FIG. 7F illustrates an example relationship between the amount of angular distortion adjustment and the change in the viewing angle, and more specifically, Eq. (9). As shown in FIG. 7F, the angles on the UI can be increased or decreased by an amount inversely proportional to tan h(β). Note that when the viewing angle β is 90°, the displayed corner angle γ on the actual UI is also 90°, i.e., no adjustment in the angle γ is needed when the viewing angle β is perpendicular.

Note that, in the actual implementation, one or more the parameters in Eq. (9) (i.e., "a," "b," "c," and/or "d") can be optimized or tuned based on the actual device design and application environment, e.g., specific display characteristics, display size, and/or sensor input (such as how far and/or where the user's eyes are). In the embodiment shown in FIG. 7F, a=1.5, b=2, c=π, and d=1. In some implementations, the parameters can be actively adjusted on a per user basis to better suit different persons' user habit and personal traits (e.g., holding angle or distance).

Also, it is noted here that the tan h( ) function discussed above is merely an example, and in one or more embodiments, functions other than the tan h( ) function can be used to achieve similar effects. For example, in certain variations, a "sigmoid" function (the plot of which is similar to "tan h") can be used. Even further, some examples can use a straight line, or a combination of multiple straight lines having different tilts, to approximate the visual effects described here. It is observed here that a suitable function may be characterized by a plot that (1) crosses the point of origin at 90° (i.e., when β is 90°, γ is also 90°); and (2) is symmetrical about the point of origin. Depending on the embodiment, it may be further characterized by that (3) an increase in β will result in a reduction in γ, and vice versa (i.e., β and γ being inversely correlated). In some embodiments, when β is near 0°, γ is near 180°, and conversely, when β is near 180°, γ is near 0°.

In the above described manners, the disclosed UI manipulation techniques enable the hiding or obscuring of sensitive information that is to be displayed on a flexible, foldable, or otherwise reconfigurable display from onlookers, while maintaining or improving the UI's accessibility to its primary user. In this way, not only is user data loss prevented, and usability and readability of the UI maintained, but the device configurable can be dynamically customized to provide an optimum security configuration tailored to the user's current surroundings. Moreover, with the assistive UI elements, an intuitive UI system can be implemented that can help the user easily achieve the optimum screen configuration for security.

It is noted here that, at least in some embodiments, the introduced UI manipulation techniques can be implemented based upon one or more existing software development kits (SDKs) that can help perform the transformations (e.g., as discussed above) to the UI given the input parameters (e.g., dimensions, folding angle, or viewing angle). Generally speaking, the class of transformations the introduced UI techniques can be built upon may be referred to as perspective transformations, which can be a subcategory under geometric image transformation related SDKs. One example of such SDKs with functions available for perspective transformations is OpenCV™. In these SDKs, there can be a number of functions that can receive the dimensions of an input image (e.g., the original, undistorted length of the edge of the UI, like $Y_0$ in FIG. 7B), inputs that describe a perspective reference (e.g., viewing angle, or an object plane), and a desired output. In many cases, the functions can be utilized, programmed or otherwise instructed to "straighten out" images on one plane and present them on a viewer-facing plane. In some embodiments of the present disclosure, the desired output can be from a "pre-distorted" graphic that accounts for changes in the viewing angle and/or the folding angle.

Grip Manipulation for Sensitive Data Protection

As discussed above, one approach to obstructing sensitive information from nearby onlookers is to cause display of a visual guidance indicium on the foldable display of a user device that prompts the user to manipulate the folding angle. The visual guidance indicium may be designed so that it appears as a select geometric shape (e.g., a circle) only when the foldable display is manipulated to a select folding angle. The visual guidance indicium may appear as another shape (e.g., a tilted oval) when the foldable display is not manipulated to the optimum folding angle.

Another approach to obstructing sensitive information from nearby onlookers is cause display of a visual guidance indicium that prompts a user to adopt a grip position for a user device that blocks the view of the nearby onlookers. An appropriate grip position may be determined based on the optimal arrangement of the hand and fingers to reduce the risk of data loss. The risk of data loss may be based on determined angles at which onlookers are present around the user device, and thus which portions of the display may presently be visible to those onlookers.

For example, a select geometric shape (e.g., a circle) may be shown on the foldable display of a user device along with an instruction to place a select finger (e.g., a pointer finger) on a select hand (e.g., a left hand) on the select geometric shape. In such embodiments, the location of the select geometric shape may be based on the folding angle and the location(s) of nearby onlooker(s). While embodiments may be described in the context of user devices having foldable displays, the features are similarly applicable to user devices having flexible, or otherwise reconfigurable displays. Thus, the processes described below may be employed by user devices having reconfigurable displays that are not flexible or foldable in order to prevent loss of sensitive information in a seemingly natural way.

As further discussed below, data on the potential security and privacy risks of the surroundings of the user device and/or data on the sensitivity of information displayed by the user device can be used to determine the optimum grip position to avoid information loss to nearby individuals. The optimum grip configuration can be used to generate UI element(s) to encourage or aid the user in adopting that configuration. For instance, data on the current grip position may be used to determine which UI element(s) should be generated so that the user shifts his or her grip to the optimum grip position. The current grip position could be determined based on, for example, readings generated by touch-sensitive elements, pressure-sensitive elements, proximity sensors, ambient light sensors, and the like.

Figure 8:
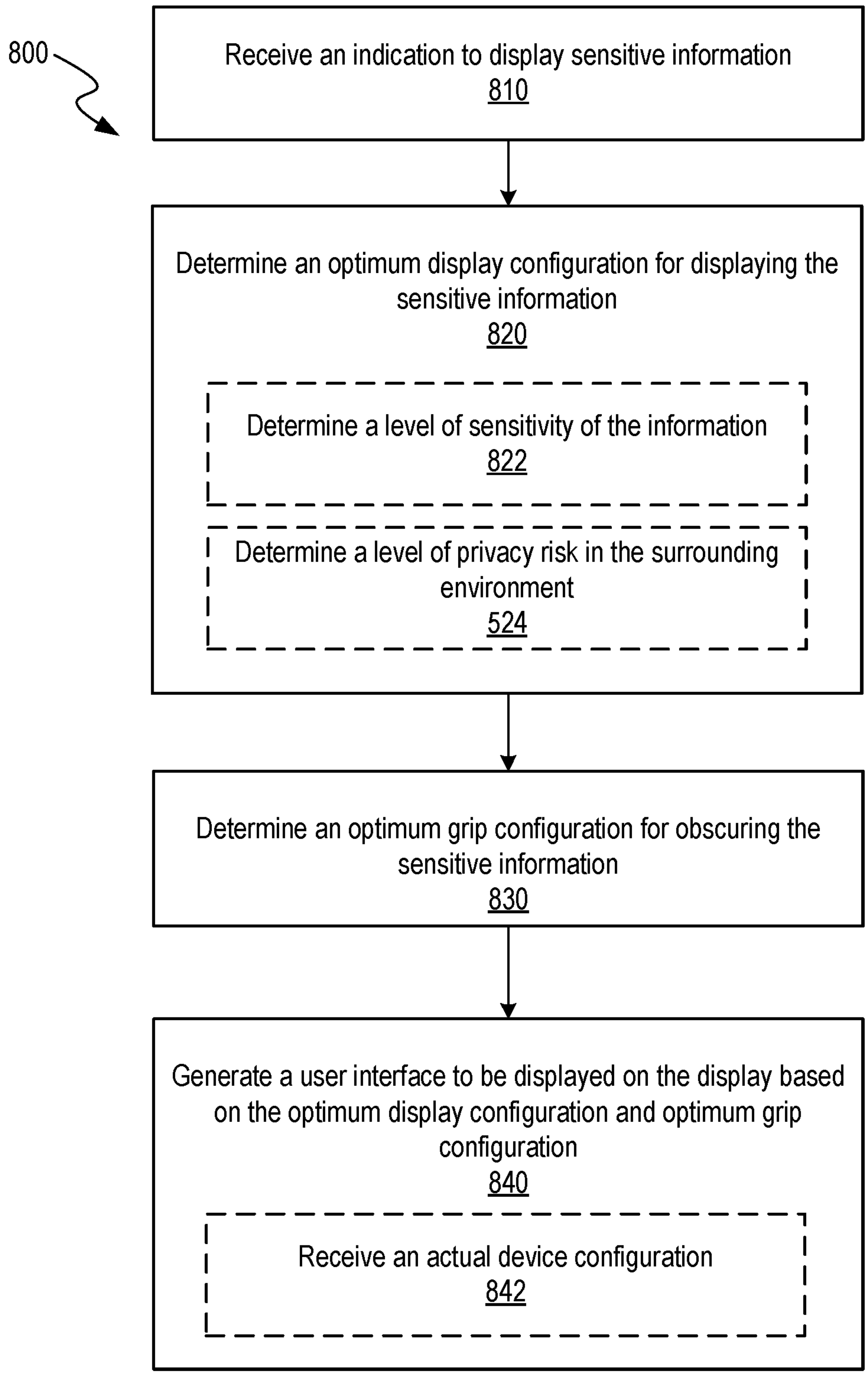
FIG. 8 illustrates a flowchart showing an example method for implementing the grip manipulation technique.

FIG. 8 illustrates a flowchart showing an example method 800 for implementing the grip manipulation technique. The method 800 can be implemented by various components (e.g., components 310-370; FIG. 3) of a UI manipulation engine (e.g., engine 300; FIG. 3) in order to protect sensitive information shown by the user device against nearby individuals. At a high level, the method 800 may be described as an algorithmic approach to determining the hand posture that will optimally prevent unintended disclosure of sensitive information shown by the user device.

First, the UI manipulation engine can receive (810) an indication to display sensitive information on a display of a user device. An example of such an indication can be a software function call. As noted above, the user device may include a foldable display, flexible display, or otherwise reconfigurable display. Then, the UI manipulation engine can determine (820) an optimum display configuration (also referred to as an "optimum grip position") for how the sensitive information is to be displayed. In a number of embodiments, the UI manipulation engine identifies (822) a level of sensitivity of the information to be displayed and then determines a form factor for how the sensitive information is to be displayed. Additionally, or alternatively, the UI manipulation engine, in determining the form factor for the UI, can determine (824) a risk of privacy in the surrounding environment of the user device. Generally, the higher the level of sensitivity of the data to be displayed, or the higher the privacy risk of the surrounding environment, the smaller the form factor of the UI. That is to say, the form factor may be inversely correlated to the risk from the surrounding environment and/or the sensitivity of the information.

Moreover, the UI manipulation engine can determine (830) an optimum grip configuration for obscuring the sensitive information. The optimum grip configuration (also referred to as an "optimum grip position") may be based on the location of nearby individuals as determined by a surrounding state finder (e.g., surrounding state finder 326; FIG. 3). For example, the surrounding state finder may determine the number of nearby individuals using machine vision face recognition techniques since the goal is to block the gaze of these individuals to prevent viewing of the display. If the display of the user device is flexible or foldable, the UI manipulation engine may further determine the optimum grip position based on the current shape or folding angle. Thus, the UI manipulation engine may use data regarding the surrounding environment and/or information sensitivity to determine the privacy requirements of the display and identify an optimum grip position for obscuring sensitive information shown thereon.

In some embodiments, the optimum grip position is further informed by the physical dimensions and abilities (collectively referred to as "hand properties") of the user. Examples of hand properties include the hand, digital, and palm size (e.g., as measured in terms of width and length) and flexibility. These hand properties may be manually input by the user, or these hand properties may be algorithmically determined based on past interactions with the mobile device. Alternatively, these hand properties may be estimated for a given user based on demographic averages. This estimate may be used directly by the algorithm, or this average may be further refined using the above-mentioned approaches.

As noted above, the optimum grip position may be determined based on the location of nearby individuals whose view of the display is to be obscured. More specifically, the UI manipulation engine may determine the optimum grip position for blocking the gaze of these nearby individuals (e.g., as determined from surroundings data) to prevent them from seeing sensitive parts of the display (e.g., as determined from UI sensitivity data). As an example, the UI manipulation engine may determine the viewing angle of each nearby individual and then determine which viewing paths need to be blocked to protect sensitive information. Then, the UI manipulation engine may generate one or more grip patterns that (i) block the viewing paths and (ii) can be feasibly achieved given the hand properties of the user.

Next, the UI manipulation engine can generate (840) the UI to be shown on the display based on the optimum display configuration and optimum grip configuration. For example, the UI manipulation engine may receive (842) data regarding the actual configuration of the user device and the location(s) of nearby individual(s) and then cause display of UI element(s) indicating where the user should place his or her hand to obscure at least a portion of the display on which sensitive information is presented. Thus, depending on the nature of the display, the UI manipulation engine may obtain data indicating orientation, folding angle, or shape. As shown in the example UIs in FIG. 10, one or more UI elements may be shown indicating where select fingers should be placed to ensure the hand is in the optimum grip position.

Figure 9:
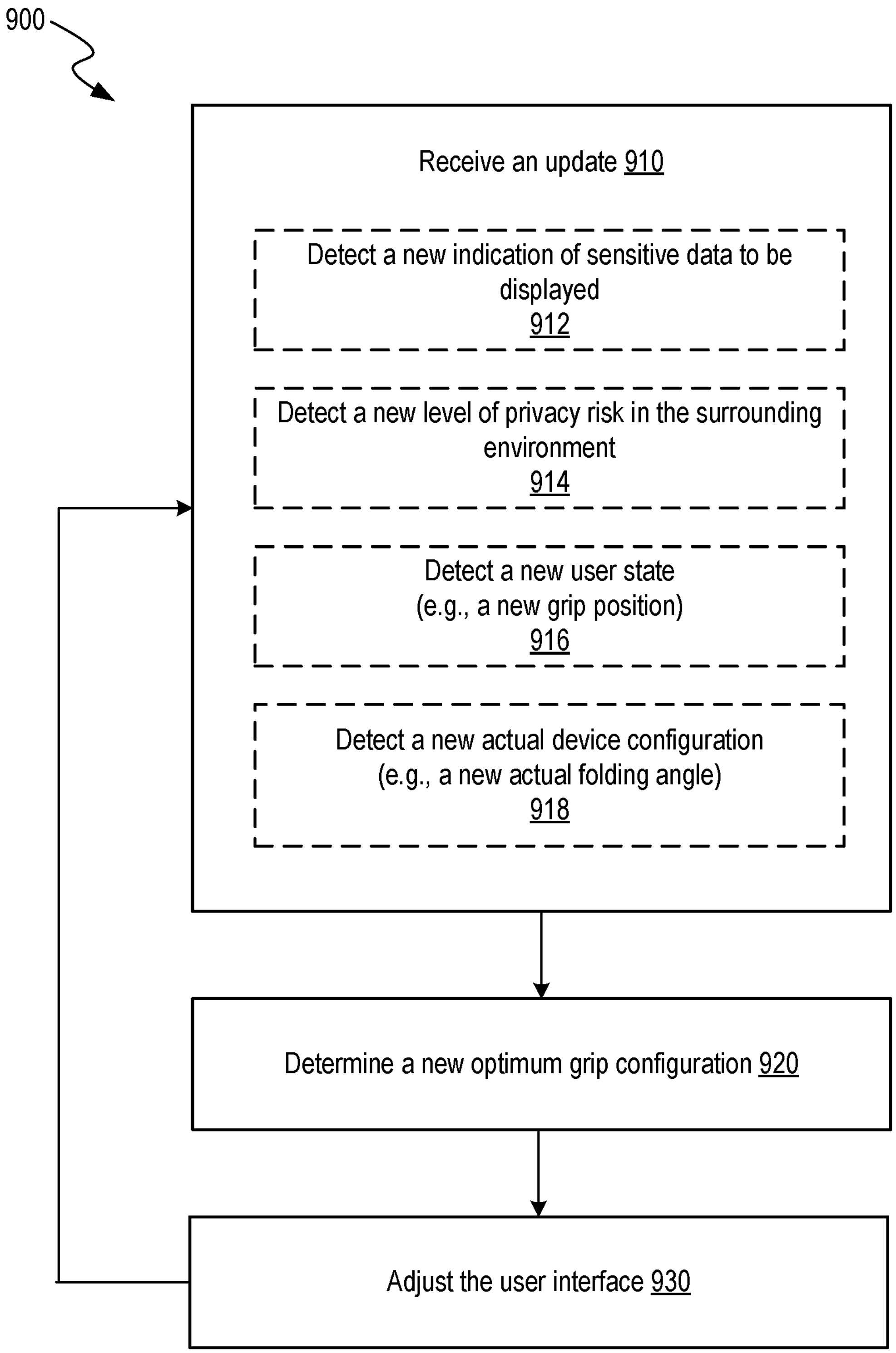
FIG. 9 illustrates a flowchart showing an example method for implementing the UI-driven grip manipulation technique.

FIG. 9 illustrates a flowchart showing an example method 900 for implementing the UI-driven grip manipulation technique. The method 900 can be implemented by various components (e.g., components 310-370; FIG. 3) of a UI manipulation engine (e.g., engine 300; FIG. 3) in order to protect sensitive information shown by a user device against nearby individuals.

The UI manipulation engine can perform an update of the UI upon receiving (910) an update on the actual, current physical configuration of the user device. For instance, the UI manipulation engine may detect one or more of the following new pieces of information: it can detect (912) a new indication of sensitive data to be displayed; it can detect (914) a new level of privacy risk in the surrounding environment of the user device; it can detect (916) a new user state (e.g., a new grip position); and/or it can detect (918) a new actual device configuration (e.g., a new orientation, folding angle, or shape).

As an example, the UI manipulation engine may continually monitor grip position by examining data (referred to as "grip data") generated by one or more sensors (referred to as "grip position sensors) built into the user device. Examples of grip position sensors include touchscreen-supporting components (e.g., touch-sensitive elements and pressure-sensitive elements), proximity sensors, ambient light sensors, gyroscopes, accelerometers, and the like. In some embodiments, the sensing of grip position is aided by active production of a stimulus, such as a vibration (e.g., created by a motor or piezoelectric element). Additionally, or alternatively, techniques involving user-facing optical sensors (e.g., cameras) may be employed to, for example, determine position of the hand based on corneal reflection. The grip data may describe various features of grip position, including the position of the palm with respect to the user device and its display and the position of the thumb(s) with respect to the user device and its display. Thus, the UI manipulation engine may obtain grip data generated by grip position sensor(s) and then examine the grip data to determine the optimal grip position.

Then, consistent with the approach described above (e.g., with respect to FIG. 8), the UI manipulation engine can determine (920) a new optimum grip position. For instance, the UI manipulation engine may determine a new optimum grip position when there is a new or updated level of sensitive information for display (912) and/or when there is a new level of privacy risk in the surrounding environment (914). As an example, if the UI manipulation engine determines that the surrounding environment has become more crowded (thereby decreasing privacy), the UI manipulation engine may determine that a new optimum grip position resulting in further obscuring of the sensitive information may be necessary.

Thereafter, the UI manipulation engine can adjust (930) the UI in accordance with the new optimum grip configuration. As further discussed below with respect to FIG. 11, the adjustments may include the addition of UI element(s) indicating where the user is to place select finger(s). In one or more implementations, the UI adjustments are performed substantially in real time as the user manipulates the display (e.g., by altering its orientation, folding angle, or shape). Similarly, the UI adjustments may be performed substantially in real time as the user moves his or her hand with respect to the user device. For example, the location of the sensitive information may be changed responsive to a determination that the user has moved his or her hand in order to interact with (e.g., touch) the display. Steps 910-930 may be repeatedly or recursively performed.

Figure 10A:
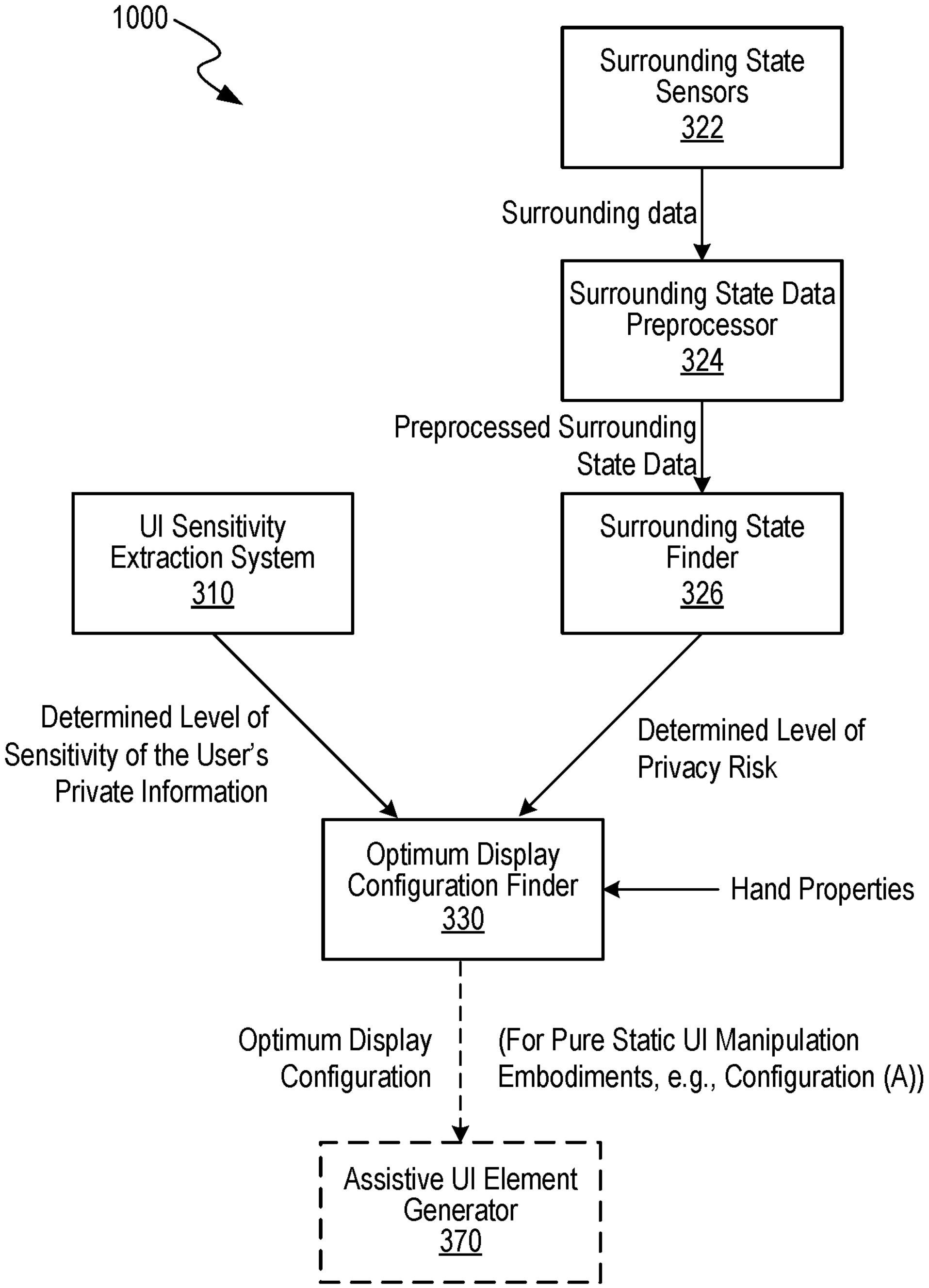
FIG. 10A is an example data flow for implementing the grip manipulation technique using some example components of the UI manipulating engine in FIG. 3.

FIG. 10A is an example data flow 1000 for implementing the grip manipulation technique using some example components of the UI manipulating engine in FIG. 3. The data flow 1000 illustrates an example of how data can flow between various blocks in a UI manipulating system (e.g., engine 300). The data flow 1000 is substantially similar to the data flow 400 of FIG. 4A. Here, however, data regarding the hand properties of the user is also obtained by the optimum display configuration finger 330. As discussed above, these data may be used to determine which grip positions could be feasibly achieved by the user.

Figure 10B:
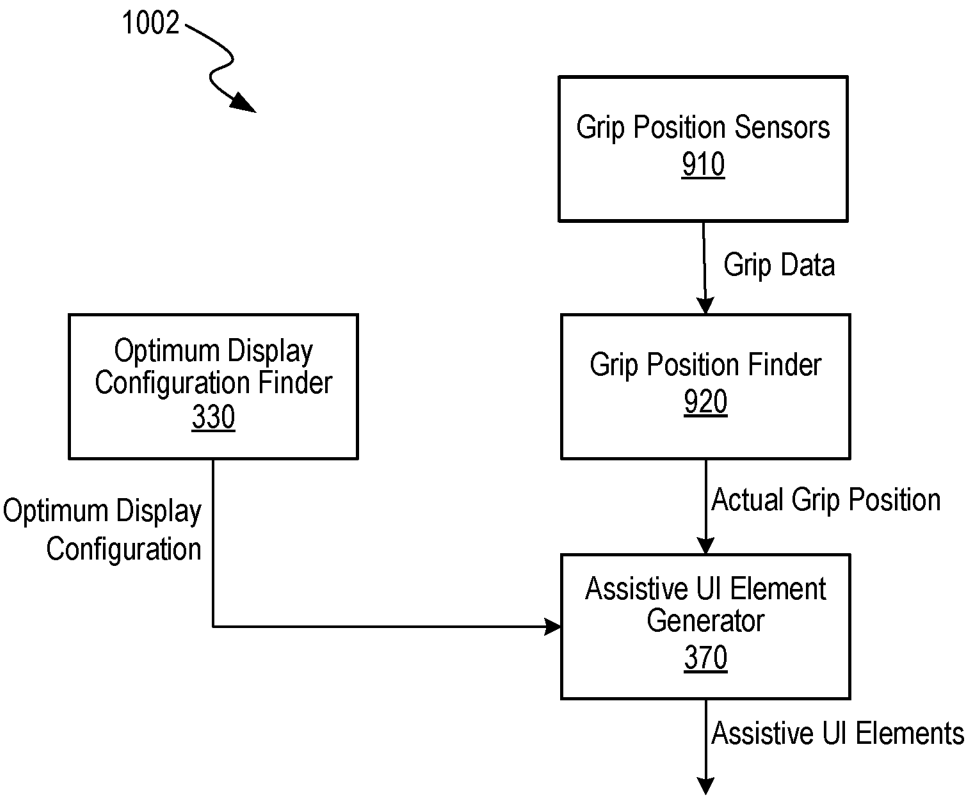
FIG. 10B is another example data flow for implementing the grip manipulation technique using some example components of the UI manipulating engine in FIG. 3.

FIG. 10B, meanwhile, is another example data flow 1002 for implementing the grip manipulation technique using some example components of the UI manipulating engine in FIG. 3. As discussed above, grip position sensor(s) 910 may be responsible for generating grip data from which the position of the hand can be inferred. Examples of grip position sensors include touchscreen-supporting components (e.g., touch-sensitive elements and pressure-sensitive elements), proximity sensors, ambient light sensors, gyroscopes, accelerometers, and the like. Additionally, or alternatively, techniques involving user-facing optical sensors (e.g., cameras) may be employed to, for example, determine position of the hand based on corneal reflection. Using the grip data, a grip position finder 920 can determine the actual grip position of the user. Said another way, the grip position finder 920 may be able to establish the actual location of the hand based on an analysis of the grip data generated by the grip position sensor(s) 910. Information regarding the actual grip position may be provided to the assistive UI element generator 370, which can be configured to generate UI element(s) to implement the grip manipulation technique based on the optimum display configuration as determined by the optimum display configuration finder 330 and the actual grip position as determined by the grip position finder 920.

FIGS. 11A-D illustrate an example implementation of the grip manipulation technique. Initially, a UI manipulation engine (e.g., engine 300; FIG. 3) executing on a user device

Figure 11A:
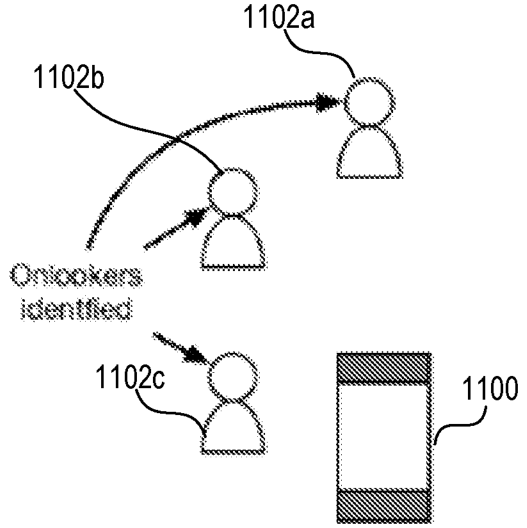
FIG. 11A illustrates how individuals in close proximity to a user device may be able to view sensitive information shown by the user device.
Figure 11B:
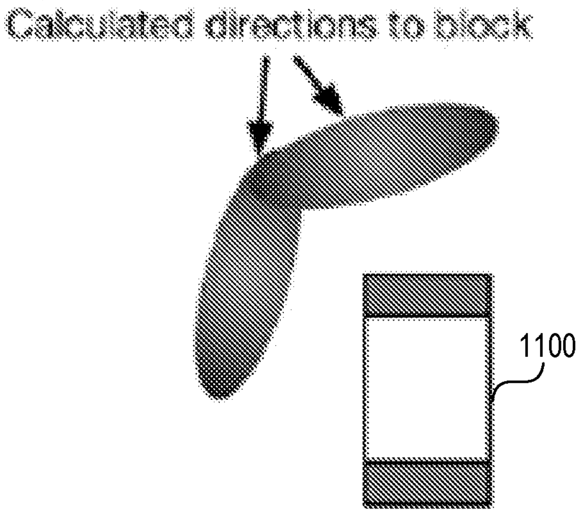
FIG. 11B illustrates how a UI manipulation engine may calculate, based on the locations of nearby individuals, which directions should be obscured to ensure privacy.

1100 can establish the location of nearby individuals 1102*a-c* as discussed above with respect to FIGS. 8-9. Such an approach enables the UI manipulation to identify the visual paths that must be blocked in order to prevent these individuals from being able to observe the display of the user device 1100. More specifically, the UI manipulation engine can calculate which direction(s) must be blocked to ensure privacy as shown in FIG. 11B.

Figure 11C:
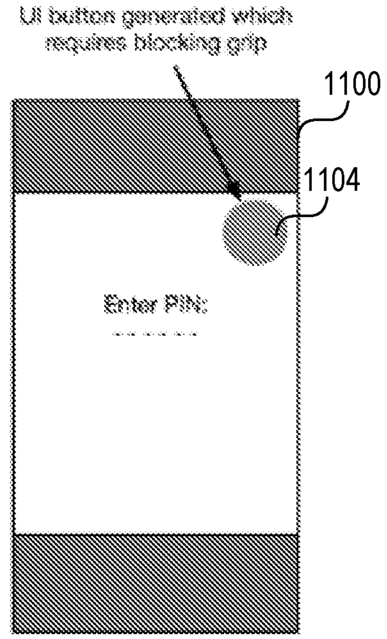
FIG. 11C illustrates how the UI manipulation engine may cause display of a visual guidance indicium that assists a user in positioning his or her hand in an optimal grip position.
Figure 11D:
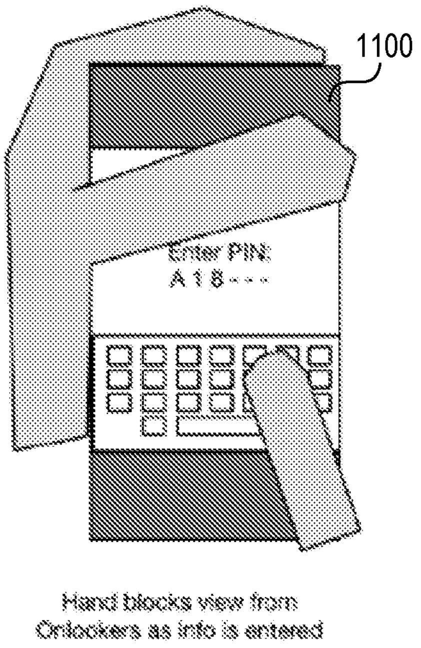
FIG. 11D illustrates how sensitive information shown by the user device may be hidden from nearby individuals when the hand is placed in the optimal grip position.

Then, the UI manipulation engine can identify appropriate UI element(s) for presentation on the display. For instance, the UI manipulation engine may determine, based on the calculated direction(s), where a visual guidance indicium should be shown on the display. In FIG. 11C, for example, the UI manipulation engine has caused presentation of a visual guidance indicium 1104 in the upper-right corner of the display. In some embodiments, the visual guidance indicium 1104 is one of multiple visual guidance indicia shown on the display. For example, the UI manipulation engine may determine that multiple visual guidance indicia are necessary in crowded environments. The multiple visual guidance indicia may correspond to select fingers on the same hand or different hands.

The visual guidance indicium 1104 may be accompanied by an instruction to place a select finger on the visual guidance indicium. When the user places the select finger 1106 on the visual guidance indicium 1104, the view of the nearby individuals 1102*a-c* will be obstructed (thereby ensuring the sensitive information remains private). In some embodiments, the visual guidance indicium 1104 is designed so that it will be substantially covered by the select finger 1106. Here, for example, the select finger 1106 has completely covered the visual guidance indicium 1104 while a portion of the display remains visible.

Many user devices have been designed to permit multi-touch functionality (or simply "multi-touch"). Multi-touch enables a touch-sensitive display to recognize the presence of more than one point of contact with the display at the same time. Accordingly, the user device 1100 may be able to detect multiple points of contact as one finger is kept in one area while another finger touches another area. To account for this, a portion of the touch-sensitive display may be defined as outside of the multi-touch target area in some embodiments. For example, the user device 1100 may be instructed not to detect touch events occurring within a fixed area of the touch-sensitive display (e.g., the visual guidance indicium 1104 and its surroundings), or the user device 1100 may be instructed to not use such touch events for determination of multi-touch behaviors. Accordingly, the touch-sensitive display may have at least one portion in which touch events are recognized for multi-touch purposes and at least one portion in which touch events are not recognized for multi-touch purposes, and a visual guidance indicium (or multiple visual guidance indicia) may be located in those portion(s) in which touch events are not recognized for multi-touch purposes.

Note that the visual guidance indicium 1104 could also be representative of an instruction to place the select finger 1106 outside the bounds of the touch-sensitive display entirely. As an example, the visual guidance indicium 1104 shown in FIG. 11C could be rendered as an arrow the indicates the select finger 1106 should be located along the top or side of the user device 1100.

At a high level, the UI element(s) generated by the UI manipulation engine generally serve one of two purposes. First, the user may need to interact with these UI element(s) to assume the optimum grip position that is necessary to activate a desired function. Second, the user may need to interact with these UI element(s) to perform the desired function. Examples of desired functions include confirming a payment, entering a password, and viewing financial or personal details. Thus, the user may not be able to perform the desired function until the optimum grip position has been assumed.

In some embodiments, the UI element(s) represent existing elements that are required for a given function. For example, the UI manipulation engine may use an existing graphic labeled "Show Password" as a UI element, though its properties (e.g., location and size) may be adjusted to fulfill the requirements discussed above. In other embodiments, the UI element(s) represent new elements that fulfill the requirements discussed above. For example, the UI manipulation engine may cause fingerprint(s) indicating where select finger(s) should be placed to overlay a UI through which a given function can be completed.

Each UI element created by a UI manipulation engine has properties that govern its appearance, function, and position. Examples of such properties include dimensions, colors, animations, and location. Similarly, these properties may specify what action, if any, is required to cause activation of the corresponding UI element (e.g., press-and-hold, swipe, repeated taps). In some embodiments, these properties are influenced by the underlying features of the underlying UI for which the UI element(s) are created/selected. For example, the color of the UI element(s) may be altered to conform with a color scheme of the underlying UI.

In some embodiments, aspects of the grip manipulation technique are controlled by the user of the user device 1100. For example, the user may be prompted to specify where the nearby individuals 1102*a-c* are located (e.g., by tapping edges of the display to indicate location). As another example, the user may be able to influence the location, number, or arrangement of visual guidance indicia (e.g., visual guidance indicium 1104). For instance, while the user may initially be prompted to place a select finger on the visual guidance indicium 1104, the user may be able to change the location of the visual guidance indicium 1104 by performing a certain action (e.g., tapping at least twice and then dragging). As noted above, hand properties of the user may be used to determine appropriate locations for visual guidance indicia shown on the user device 1100. In some embodiments, the user may be prompted to complete a calibration process in which different arrangements of visual guidance indicia are shown on the display of the user device 1100. These arrangements may include different numbers of visual guidance indicia that are positioned in various locations. Based on the speed and ease with which the user is able to position the select finger(s) on the one or more visual guidance included in each arrangement, the UI manipulation engine may learn the arrangements that are most appropriate for the user.

Computer System and Device Architecture

Figure 12:
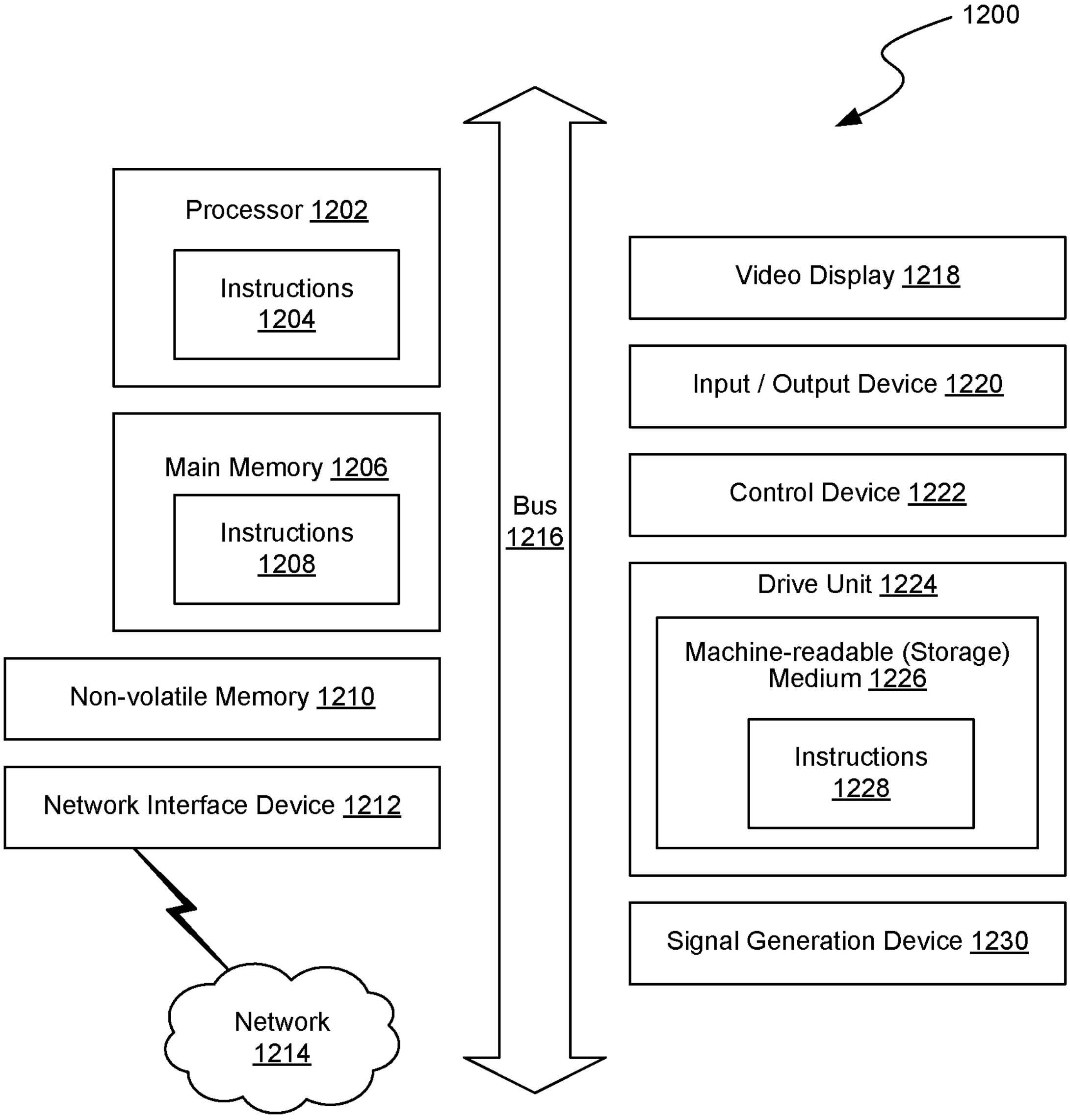
FIG. 12 illustrates a high-level block diagram showing an example of a mobile system in which at least some operations related to the techniques introduced here can be implemented.

FIG. 12 is a block diagram illustrating an example of a computing system 1200 in which at least some operations described herein can be implemented. For example, some components of the computing system 1200 utilized to implement a computing device (e.g., the user device 130, 230 of FIGS. 1A and 2A) that includes an UI manipulation engine (e.g., the UI manipulation engine 300 of FIG. 3).

The computing system 1200 may include one or more central processing units (also referred to as "processors") 1202, main memory 1206, non-volatile memory 1210, network adapter 1212 (e.g., network interface), video display

1218, input/output devices 1220, control device 1222 (e.g., keyboard and pointing devices), drive unit 1224 including a storage medium 1226, and signal generation device 1230 that are communicatively connected to a bus 1216. The bus 1216 is illustrated as an abstraction that represents one or more physical buses and/or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus (also referred to as “Firewire”).

The computing system 1200 may share a similar computer processor architecture as that of a personal computer, tablet computer, mobile phone, game console, music player, wearable electronic device (e.g., a watch or fitness tracker), network-connected (“smart”) device (e.g., a television or home assistant device), virtual/augmented reality systems (e.g., a head-mounted display), or another electronic device capable of executing a set of instructions (sequential or otherwise) that specify action(s) to be taken by the computing system 1200.

While the main memory 1206, non-volatile memory 1210, and storage medium 1226 (also called a “machine-readable medium”) are shown to be a single medium, the term “machine-readable medium” and “storage medium” should be taken to include a single medium or multiple media (e.g., a centralized/distributed database and/or associated caches and servers) that store one or more sets of instructions 1228. The term “machine-readable medium” and “storage medium” shall also be taken to include any medium that is capable of storing, encoding, or carrying a set of instructions for execution by the computing system 1200.

In general, the routines executed to implement the embodiments of the disclosure may be implemented as part of an operating system or a specific application, component, program, object, module, or sequence of instructions (collectively referred to as “computer programs”). The computer programs typically comprise one or more instructions (e.g., instructions 1204, 1208, 1228) set at various times in various memory and storage devices in a computing device. When read and executed by the one or more processors 1202, the instruction(s) cause the computing system 1200 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1210, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1212 enables the computing system 1200 to mediate data in a network 1214 with an entity that is external to the computing system 1200 through any communication protocol supported by the computing system 1200 and the external entity. The network adapter 1212 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1212 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A non-transitory, computer-readable medium with instructions stored thereon that, when executed by a processor of a mobile device with a flexible display, cause the mobile device to perform operations comprising:

receiving input indicative of a request to display sensitive information on the flexible display;

generating a user interface that presents the sensitive information in a given form that has a visually deformed appearance to a user unless the flexible display is manipulated to a given shape; and adjusting the user interface in real time to account for changes in a location of an eye of the user.

2. The non-transitory, computer-readable medium of claim 1, wherein the operations further comprise:

determining a form factor for displaying the sensitive information that is smaller than a full area of the flexible display;

wherein said generating is based on the form factor.

3. The non-transitory, computer-readable medium of claim 1, wherein the flexible display is a bi-fold display.

4. The non-transitory, computer-readable medium of claim 1, wherein the operations further comprise:

identifying (i) a level of sensitivity of the sensitive information and/or (ii) a level of privacy risk of a surrounding environment in which the user is located.

5. The non-transitory, computer-readable medium of claim 4, wherein a characteristic of the user interface is based on the level of sensitivity or the level of privacy risk.

6. The non-transitory, computer-readable medium of claim 5, wherein the characteristic is a size of the user interface, a folding angle at which the user interface is viewable by the user, or a viewing angle at which the user interface is viewable by the user.

7. The non-transitory, computer-readable medium of claim 1, wherein the operations further comprise:

generating a visual indicium that guides the user to manipulate the flexible display to the given shape.

8. A method for displaying information on a mobile device having a foldable display that is foldable along at least a folding axis, the method comprising:

determining a form factor for how the information is to be displayed, wherein the form factor is equal to or smaller than a full area of the foldable display; and generating, based on the form factor, a user interface to be displayed on the foldable display, wherein the user interface is to show the information in the form factor but visually deformed to a user unless the foldable display is folded along the folding axis to a select angle.

9. The method of claim 8, wherein the user interface is collectively displayed by a plurality of sections of the foldable display.

10. The method of claim 8, further comprising:

determining a folding angle to which sections of the foldable display must be folded in order for the user interface to not appear distorted to the user.

11. The method of claim 8, wherein the user interface is symmetrically deformed about the folding axis along which the foldable display is foldable.

12. The method of claim 8, further comprising:

determining a viewing angle at which the user interface must be viewed in order for the user interface to not appear distorted to the user.

13. The method of claim 8, further comprising:

receiving a current orientation status from an orientation sensor included in the mobile device; and adjusting the user interface based on the current orientation status.

14. The method of claim 8, further comprising:

generating a visual indicium that guides the user to manipulate the foldable display to the select angle.

15. The method of claim 14, wherein the visual indicium appears to the user as a select geometric shape only when the foldable display is manipulated to the select angle.

16. The method of claim 14, wherein the visual indicium appears to the user as a select picture only when the foldable display is manipulated to the select angle.

17. The method of claim 14, further comprising:

receiving a current angle of the foldable display; and generating, based on a difference between the current angle and the select angle, additional guidance to guide the user to manipulate the foldable display to the select angle.

18. The method of claim 17, wherein the additional guidance is presented on the foldable display in text form.

19. A mobile device comprising:

a flexible display;

a memory that includes instructions for displaying information on the flexible display; and a processor that, upon executing the instructions, is configured to:

receive an indication to display the information on the flexible display, generate a user interface that presents the information in a given form that has a visually deformed appearance to a user unless the flexible display is manipulated to a given shape, determine a current shape of the flexible display, and generate, based on a difference between the current shape and the given shape, guidance to guide the user to manipulate the flexible display to the given shape.

20. The mobile device of claim 19, wherein the flexible display is a bi-fold display.

21. The mobile device of claim 20, wherein the user interface is symmetrically deformed about a folding axis along which the bi-fold display is foldable.

22. The mobile device of claim 20, wherein the processor is further configured to:

change an original layout of the information to an alternative layout that is smaller than the original layout and suitable for display in a portion of the flexible display.

23. The mobile device of claim 19, wherein the processor is further configured to:

identify a level of sensitivity of the information, wherein the given form of the user interface is based on the level of sensitivity.

24. The mobile device of claim 19, wherein the processor is further configured to:

identify a level of privacy risk in a surrounding environment, wherein the given form of the user interface is based on the level of privacy risk.

25. A mobile device comprising:

a flexible display;

a memory that includes instructions for displaying information on the flexible display; and a processor that, upon executing the instructions, is configured to:

receive an indication to display the information on the flexible display, generate a user interface that presents the information in a given form that has a visually deformed appearance to a user unless the flexible display is manipulated to a given shape, and generate a visual indicium that guides the user to manipulate the flexible display to the given shape.

26. The mobile device of claim 25, wherein the processor is further configured to:

establish a current shape of the flexible display, and generate, based on a difference between the current shape and the given shape, additional guidance that guides the user to manipulate the flexible display to the given shape.

27. The mobile device of claim 26, wherein the additional guidance is presented on the flexible display in text form.

28. The mobile device of claim 25, wherein the processor is further configured to:

establish a current shape of the flexible display, update the given form based on the current shape, and adjust the user interface to conform to the updated form.

29. A non-transitory, computer-readable medium with instructions stored thereon that, when executed by a processor of a mobile device with a flexible display, cause the mobile device to perform operations comprising:

receiving input indicative of a request to display information on the flexible display;

generating a user interface that presents the information in a given form that has a visually deformed appearance to a user unless the flexible display is manipulated to a given shape, wherein the user interface is presented in a portion of the flexible display; and generating (i) a first visual indicium that guides the user to manipulate the flexible display to the given shape, and (ii) a second visual indicium that guides the user to grip the mobile device in such a manner that the portion of the flexible display is obstructed.

30. The non-transitory, computer-readable medium of claim 29, wherein the second visual indicium is based on the given shape into which the flexible display is to be manipulated.

* * * * *